United States Patent
Yang

(10) Patent No.: US 9,109,806 B2
(45) Date of Patent: Aug. 18, 2015

(54) HEATING/COOLING SYSTEM THAT UTILIZES SECONDARY FLUID PUMPED THROUGH A HEAT EXCHANGER BY THE PRESSURE OF A THERMAL EXCHANGE FLUID

(76) Inventor: Tai-Her Yang, Dzan-Hwa (TW)

( * ) Notice: Subject to any disclaimer, the term of this patent is extended or adjusted under 35 U.S.C. 154(b) by 0 days.

(21) Appl. No.: 13/215,266

(22) Filed: Aug. 23, 2011

(65) Prior Publication Data

US 2013/0043011 A1 Feb. 21, 2013

Related U.S. Application Data

(63) Continuation-in-part of application No. 13/213,209, filed on Aug. 19, 2011, now abandoned.

(51) Int. Cl.

| F25B 29/00 | (2006.01) |
|---|---|
| F24F 1/00 | (2011.01) |
| F24F 13/30 | (2006.01) |
| F28F 9/02 | (2006.01) |
| F24D 5/02 | (2006.01) |
| F28D 21/00 | (2006.01) |
| F24D 19/00 | (2006.01) |

(52) U.S. Cl.
CPC ............ *F24F 1/0007* (2013.01); *F24D 5/02* (2013.01); *F24F 13/30* (2013.01); *F28F 9/0268* (2013.01); *F24D 19/0087* (2013.01); *F28D 2021/0035* (2013.01); *F28F 2250/08* (2013.01)

(58) Field of Classification Search
CPC ....... F24F 1/0007; F24F 13/30; F28F 9/0268; F28F 2250/08; F24D 5/02; F28D 2021/0035

USPC .......... 165/200, 201; 60/266, 613, 614, 641.1, 60/641.8, 645, 325, 398, 412, 428, 431, 60/445, 641.4, 641.6
See application file for complete search history.

(56) References Cited

U.S. PATENT DOCUMENTS

| 795,761 | A | * | 7/1905 | Fulton | 60/641.6 |
|---|---|---|---|---|---|
| 3,736,744 | A | * | 6/1973 | Bailey | 60/698 |
| 3,822,554 | A | * | 7/1974 | Kelly | 60/655 |
| 3,846,987 | A | * | 11/1974 | Baldwin | 60/690 |
| 3,908,381 | A | * | 9/1975 | Barber et al. | 60/641.4 |
| 3,952,723 | A | * | 4/1976 | Browning | 126/247 |
| 3,953,971 | A | * | 5/1976 | Parker | 60/641.6 |
| 3,972,195 | A | * | 8/1976 | Hays et al. | 60/671 |
| 3,989,189 | A | * | 11/1976 | Kita | 126/247 |
| 4,036,017 | A | * | 7/1977 | Siegel | 60/641.6 |
| 4,041,705 | A | * | 8/1977 | Siegel | 60/641.6 |
| 4,059,959 | A | * | 11/1977 | Matthews | 60/641.4 |
| 4,077,220 | A | * | 3/1978 | Matthews | 60/641.4 |
| 4,085,544 | A | * | 4/1978 | Blake | 60/325 |
| 4,095,429 | A | * | 6/1978 | Morey | 60/641.6 |
| 4,112,687 | A | * | 9/1978 | Dixon | 60/641.6 |
| 4,114,809 | A | * | 9/1978 | Sampson | 126/570 |
| 4,117,696 | A | * | 10/1978 | Fawcett et al. | 60/325 |
| 4,122,675 | A | * | 10/1978 | Polyak | 60/398 |
| 4,135,366 | A | * | 1/1979 | Siegel | 60/641.6 |
| 4,142,367 | A | * | 3/1979 | Guisti | 60/398 |

(Continued)

*Primary Examiner* — Ljiljana Ciric
(74) *Attorney, Agent, or Firm* — Bacon & Thomas, PLLC

(57) ABSTRACT

A building heating/cooling system utilizes secondary fluid that at least partially circulates through a secondary fluid pump set and a heat exchanger. The secondary fluid is heated or cooled by thermal energy exchange with a thermal energy fluid in the heat exchanger. The thermal energy fluid in the heat exchanger also drives the secondary fluid pump set that circulates the secondary fluid.

19 Claims, 25 Drawing Sheets

(56) References Cited

U.S. PATENT DOCUMENTS

| | | | | |
|---|---|---|---|---|
| 4,143,522 A * | 3/1979 | Hamrick et al. | | 60/398 |
| 4,181,468 A * | 1/1980 | Kent et al. | | 60/641.4 |
| 4,187,686 A * | 2/1980 | Pommier | | 60/641.6 |
| 4,197,715 A * | 4/1980 | Fawcett et al. | | 60/325 |
| 4,201,060 A * | 5/1980 | Outmans | | 60/641.2 |
| 4,209,982 A * | 7/1980 | Pitts | | 60/325 |
| 4,220,003 A * | 9/1980 | Doi | | 60/398 |
| 4,254,626 A * | 3/1981 | Anderson | | 60/641.6 |
| 4,260,902 A * | 4/1981 | Crider | | 60/398 |
| 4,299,198 A * | 11/1981 | Woodhull | | 60/641.1 |
| 4,307,573 A * | 12/1981 | King | | 60/641.6 |
| 4,324,983 A * | 4/1982 | Humiston | | 60/641.6 |
| 4,328,673 A * | 5/1982 | Matthews | | 60/641.4 |
| 4,342,196 A * | 8/1982 | Yeh | | 60/531 |
| 4,370,859 A * | 2/1983 | Assaf | | 60/641.6 |
| 4,423,599 A * | 1/1984 | Veale | | 60/641.8 |
| 4,448,237 A * | 5/1984 | Riley | | 165/45 |
| 4,455,834 A * | 6/1984 | Earle | | 60/641.1 |
| 4,588,424 A * | 5/1986 | Heath et al. | | 96/242 |
| 4,607,169 A * | 8/1986 | Donnelly, Jr. | | 62/260 |
| 4,637,209 A * | 1/1987 | Clark | | 60/660 |
| 4,742,682 A * | 5/1988 | Assaf et al. | | 60/641.1 |
| 5,117,635 A * | 6/1992 | Blau | | 60/668 |
| 5,226,593 A * | 7/1993 | Beryozkin et al. | | 237/1 R |
| 5,488,828 A * | 2/1996 | Brossard | | 60/641.6 |
| 5,685,147 A * | 11/1997 | Brassea | | 60/641.6 |
| 5,709,201 A * | 1/1998 | Puett, Jr. | | 126/247 |
| 5,979,435 A * | 11/1999 | Puett, Jr. | | 126/247 |
| 6,594,997 B2 * | 7/2003 | Romanelli | | 60/651 |
| 7,062,911 B2 * | 6/2006 | Yang | | 60/641.6 |
| 7,084,521 B1 * | 8/2006 | Martin | | 290/54 |
| 7,340,899 B1 * | 3/2008 | Rubak et al. | | 60/641.8 |
| 7,870,735 B2 * | 1/2011 | Romanelli et al. | | 60/653 |
| 7,877,999 B2 * | 2/2011 | Nuel et al. | | 60/641.1 |
| 7,958,731 B2 * | 6/2011 | McBride et al. | | 60/645 |
| 8,122,718 B2 * | 2/2012 | McBride et al. | | 60/613 |
| 8,215,104 B2 * | 7/2012 | Riley | | 60/398 |
| 8,449,726 B2 * | 5/2013 | Alawadi | | 60/641.8 |
| 8,459,248 B2 * | 6/2013 | Milder et al. | | 165/200 |
| 8,482,148 B2 * | 7/2013 | Kobayashi | | 60/641.1 |
| 2013/0213039 A1* | 8/2013 | Bohl et al. | | 60/641.8 |

* cited by examiner

HEATING/COOLING SYSTEM THAT UTILIZES SECONDARY FLUID PUMPED THROUGH A HEAT EXCHANGER BY THE PRESSURE OF A THERMAL EXCHANGE FLUID

CROSS-REFERENCE TO RELATED APPLICATION

This application is a Continuation-In-Part of my patent application Ser. No. 13/213,209, filed on Aug. 19, 2011.

BACKGROUND OF THE INVENTION (a) Field of the Invention

Without utilizing external mechanical rotary kinetic energy or the power of an electric motor, the present invention utilizes a pressurized thermal energy fluid to pass through a heat exchanger (100) having a flowpath for passage of the pressurized thermal exchange fluid, and a fluid actuation device (200) installed in a fluid actuation device assembly (20) in series connection, parallel connection or series-parallel connection with the flowpath of the heat exchanger (100) for utilizing the pressurized thermal exchange fluid in the heat exchanger (100) to release thermal energy to a secondary fluid and for also utilizing the pressure of the pressurized thermal exchange fluid to drive a fluid actuation device (200) installed in the fluid actuation device assembly (20) to generate the rotary kinetic energy, thereby directly or through a magnetic non-contact insulation type transmission device (210) driving a secondary fluid pump set (202) to pump the secondary fluid to pass through a secondary fluid flowpath structure (500), (500) a secondary fluid flow guide plate (600), and the heat exchanger (100) installed in a building, the pumped secondary fluid then entering a temperature differentiation body space 1000 in the interior of the building, wherein a part of the secondary fluid with thermal energy passing the heat exchanger (100) and the temperature differentiation body space returns to a secondary fluid inlet port to again be pumped by the secondary fluid pump set (202) for partially circulating the secondary fluid.

(b) Description of the Prior Art

A conventional heat exchanger having a fluid pipeline for allowing thermal energy fluid to pass through often utilizes the external mechanical rotary kinetic energy or power of an electric motor to drive a fluid pump set to rotate, and then further drive the air flow to pass through the heat exchanger, thereby increasing the heat exchange efficiency of the heat exchanger. Primary drawbacks thereof are increasing the cost for installation and increasing the consumed energy. In addition, the air flow with thermal energy is pumped to an open space and a fluid return operation is not provided, and thus thermal energy is unnecessarily dissipated.

SUMMARY OF THE INVENTION

Without utilizing external mechanical rotary kinetic energy or the power of an electric motor, the present invention utilizes a pressurized thermal energy fluid to pass through a flowpath in a heat exchanger (100). Before passing through the flowpath in the heat exchanger (100), the thermal energy fluid passes through a fluid actuation device (200) installed in a fluid actuation device assembly (20) in series connection, parallel connection or series-parallel connection. The thermal energy fluid thus passes through the heat exchanger (100) to release thermal energy to the secondary fluid and also passes through the fluid actuation device (200) installed in the fluid actuation device assembly (20) to generate the rotary kinetic energy, thereby directly or through a magnetic non-contact insulation type transmission device (210) driving a secondary fluid pump set (202) to pump the secondary fluid past the heat exchanger (100), such that the heat exchanger (100) is enabled to perform thermal releasing of cooling or heating to the secondary fluid. The above-described components may be installed in a closed type or semi-opened building, and the fluid actuation device (200) driven by the pressurized thermal energy fluid is utilized to drive the secondary fluid pump set (202) for pumping the secondary fluid to pass through a secondary fluid flowpath structure (500), a flow guide plate of secondary fluid (600), and the heat exchanger (100) installed in a building, and then to enter a temperature differentiation body space configured by secondary fluid in the interior of the building, wherein a part of the secondary fluid with thermal energy passing the heat exchanger (100) and the temperature differentiation body space returns to a secondary fluid inlet port of the building, and then is again pumped by the secondary fluid pump set (202) for forming an at least partial circulation of secondary fluid.

DESCRIPTION OF MAIN COMPONENT SYMBOLS

Figure 1:
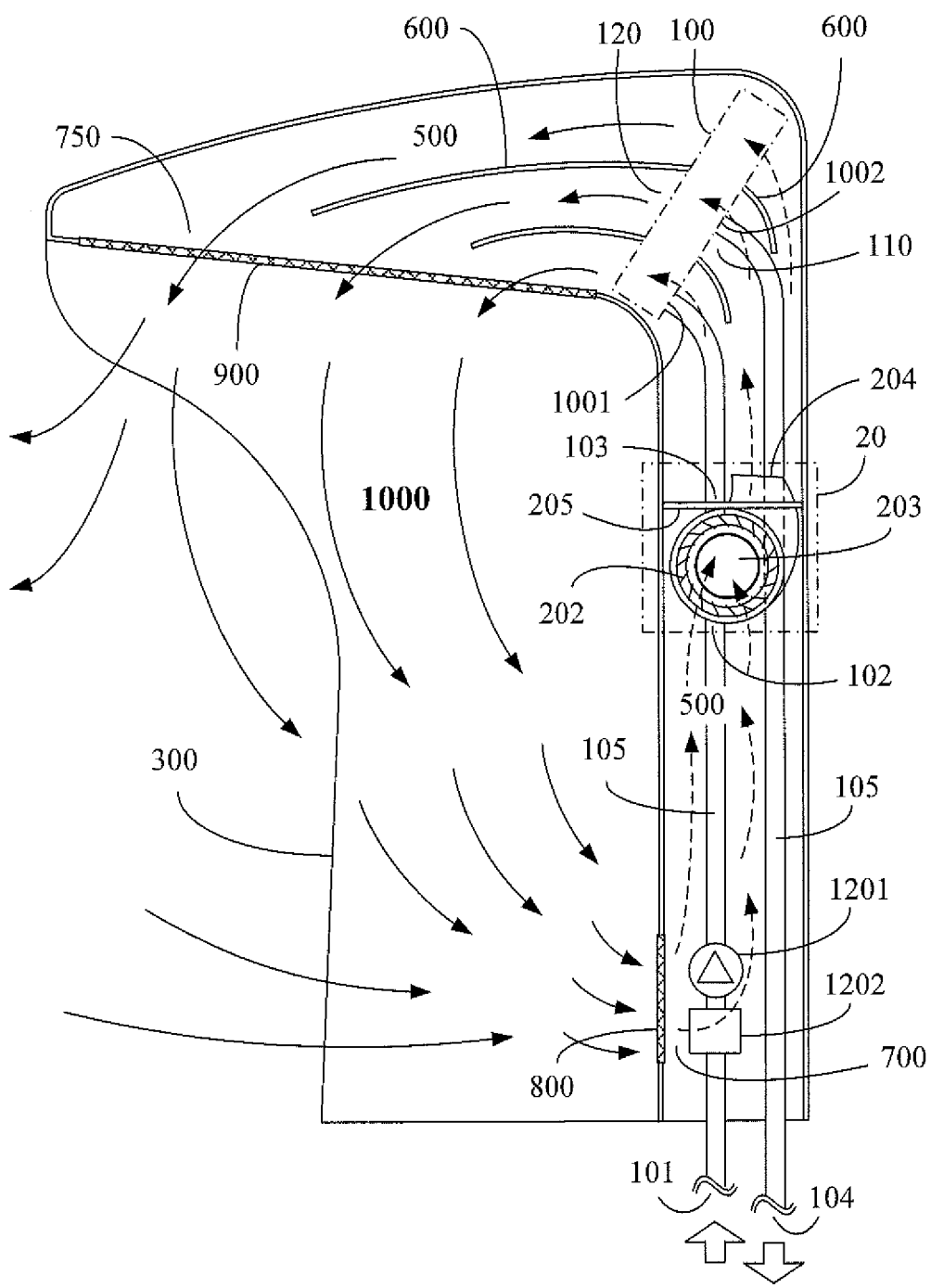
FIG. 1 is a lateral structural view showing the present invention being applied in a semi-opened building, wherein the heat exchanger (100) being installed in the flowpath structure (500) and close to the fluid actuation device assembly (20), according to one embodiment of the present invention.

20: Fluid actuation device assembly
100: Heat exchanger with flowpath
110: Secondary fluid inlet of heat exchanger with flowpath
120: Secondary fluid outlet of heat exchanger with flowpath
101: Thermal energy fluid inlet
104: Thermal energy fluid outlet
102: Fluid inlet of fluid actuation device
103: Fluid outlet of fluid actuation device
105: Thermal energy fluid pipeline
200: Fluid actuation device
201: Rotation shaft
202: Secondary fluid pump set
203: Secondary fluid inlet of secondary fluid pump set
204: Secondary fluid outlet of secondary fluid pump set
205: Partition board
210: Magnetic non-contact insulation type transmission device
211: Passive rotation part of magnetic coupling member
212: Active rotation part of magnetic coupling member
220: Input shaft of magnetic non-contact insulation type transmission device
221: Output shaft of magnetic non-contact insulation type transmission device
300: Semi-opened building
400: Closed type building
500: Flowpath structure of secondary fluid
600: Flow guide plate of secondary fluid
700: Secondary fluid inlet
750: Secondary fluid outlet
800: Inlet protection net of secondary fluid
900: Outlet protection net of secondary fluid
999: Fluid source of pressurized thermal energy fluid
1001: Thermal energy fluid inlet of heat exchanger
1002: Thermal energy fluid outlet of heat exchanger
1000: Temperature differentiation body space
1100: Fluid pipeline for transmitting natural thermal energy
1201: Thermal energy fluid pump
1202: Flow regulation valve of thermal energy fluid
1203: Auxiliary temperature regulation device

DETAILED DESCRIPTION OF THE PREFERRED EMBODIMENTS

A conventional heat exchanger having a fluid pipeline for allowing thermal energy fluid to pass through often utilizes the external mechanical rotary kinetic energy or power of an electric motor to drive a fluid pump set to rotate, and then further to drive the airflow to pass through the heat exchanger, thereby increasing the heat exchange efficiency of the heat exchanger. Primary drawbacks thereof are increasing the cost for installation and increasing the consumed energy. In addition, the airflow with thermal energy is pumped to an opened space and a return operation is not provided, so that thermal energy is unnecessarily dissipated.

Without utilizing external mechanical rotary kinetic energy or the power of an electric motor, the present invention utilizes a pressurized thermal energy fluid that passes through a heat exchanger (100) and a fluid actuation device (200) installed in a fluid actuation device assembly (20) in series connection, parallel connection or series-parallel connection so that the thermal energy fluid both releases thermal energy to a secondary fluid in the heat exchanger (100) and drives a fluid actuation device (200) installed in the fluid actuation device assembly (20) to generate rotary kinetic energy, thereby directly or through a magnetic non-contact insulation type transmission device (210) driving a secondary fluid pump set (202) to pump the secondary fluid to pass the heat exchanger (100), such that the heat exchanger (100) is enabled to perform thermal releasing of cooling or heating to the secondary fluid. The above-described components are installed in a closed type or semi-opened building, and the fluid actuation device (200) driven by pressurized the thermal energy fluid is utilized to drive the secondary fluid pump set (202) for pumping the secondary fluid to pass through a flowpath structure (500), a flow guide plate (600), and the heat exchanger (100) installed in a building, and then to enter a temperature differentiation body space configured by secondary fluid in the interior of the building, wherein a part of the secondary fluid with thermal energy passing the heat exchanger (100) and the temperature differentiation body space returns to a secondary fluid inlet port of the building, and then is again pumped by the secondary fluid pump set (202) for providing partial circulation of the secondary fluid.

Figure 2:
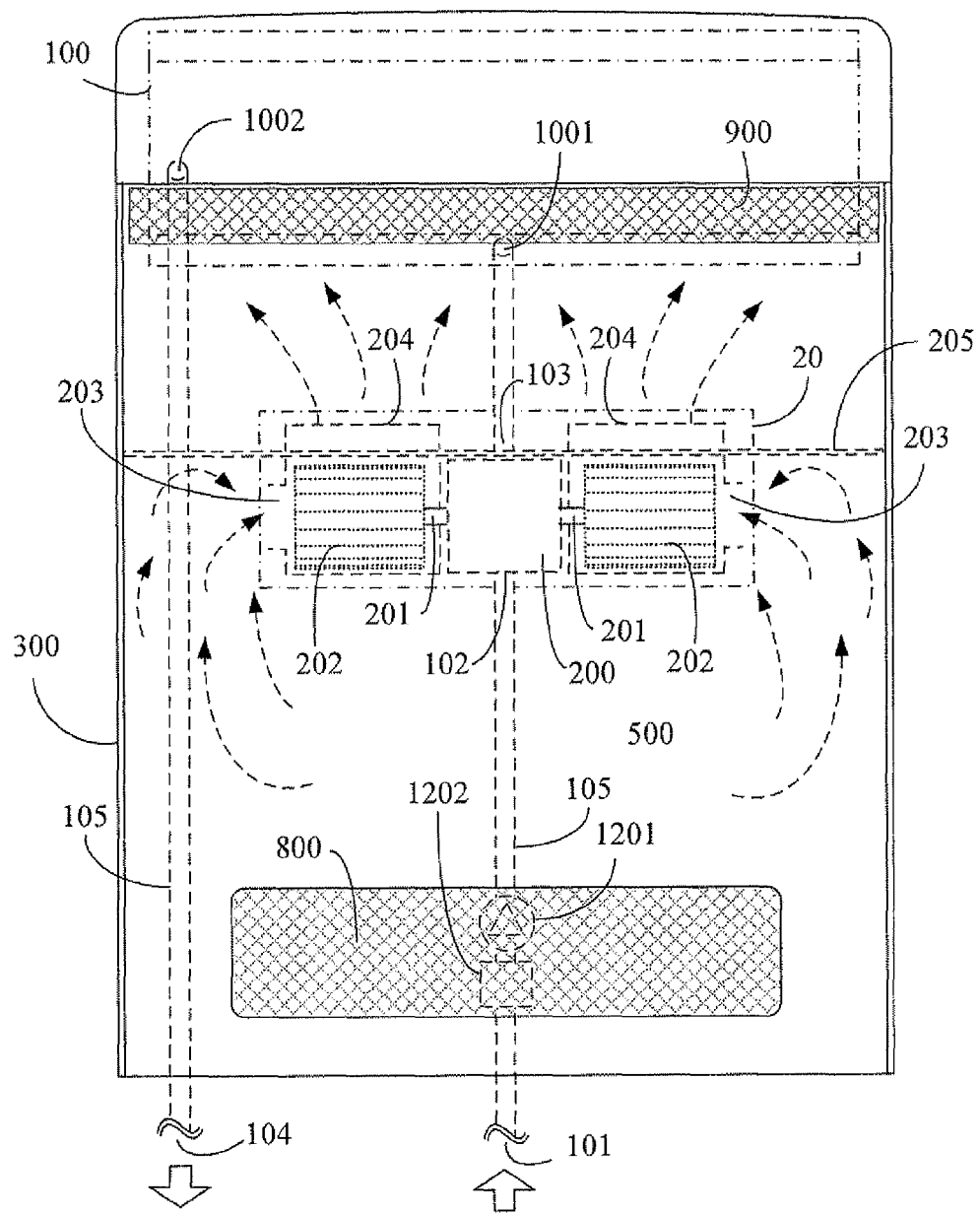
FIG. 2 is a front view of the embodiment disclosed in FIG. 1.
Figure 3:
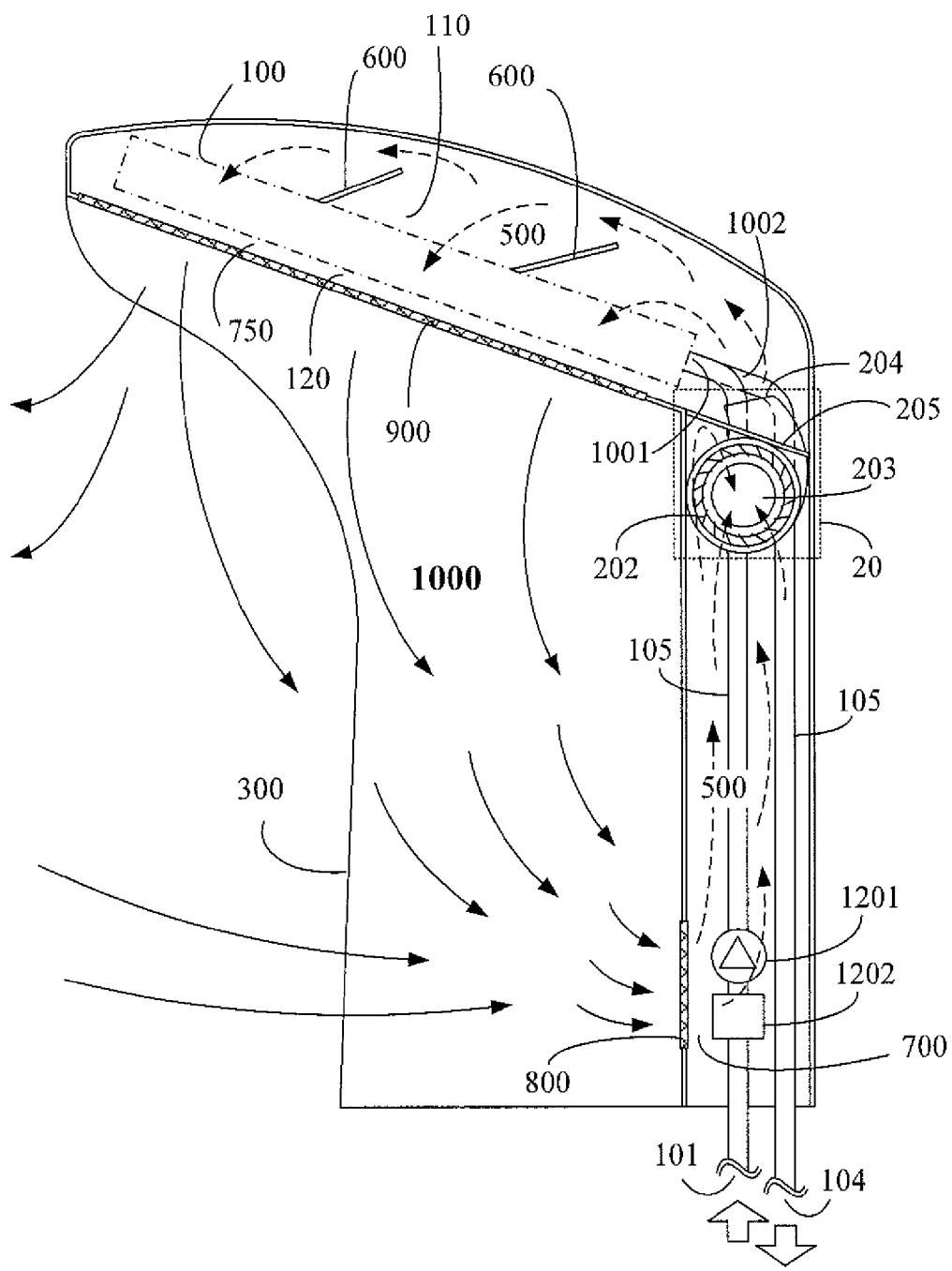
FIG. 3 is a lateral structural view showing the present invention being applied in a semi-opened building, wherein the heat exchanger (100) being installed in the flowpath structure (500) and close to the secondary fluid outlet port (750), according to one embodiment of the present invention.
Figure 4:
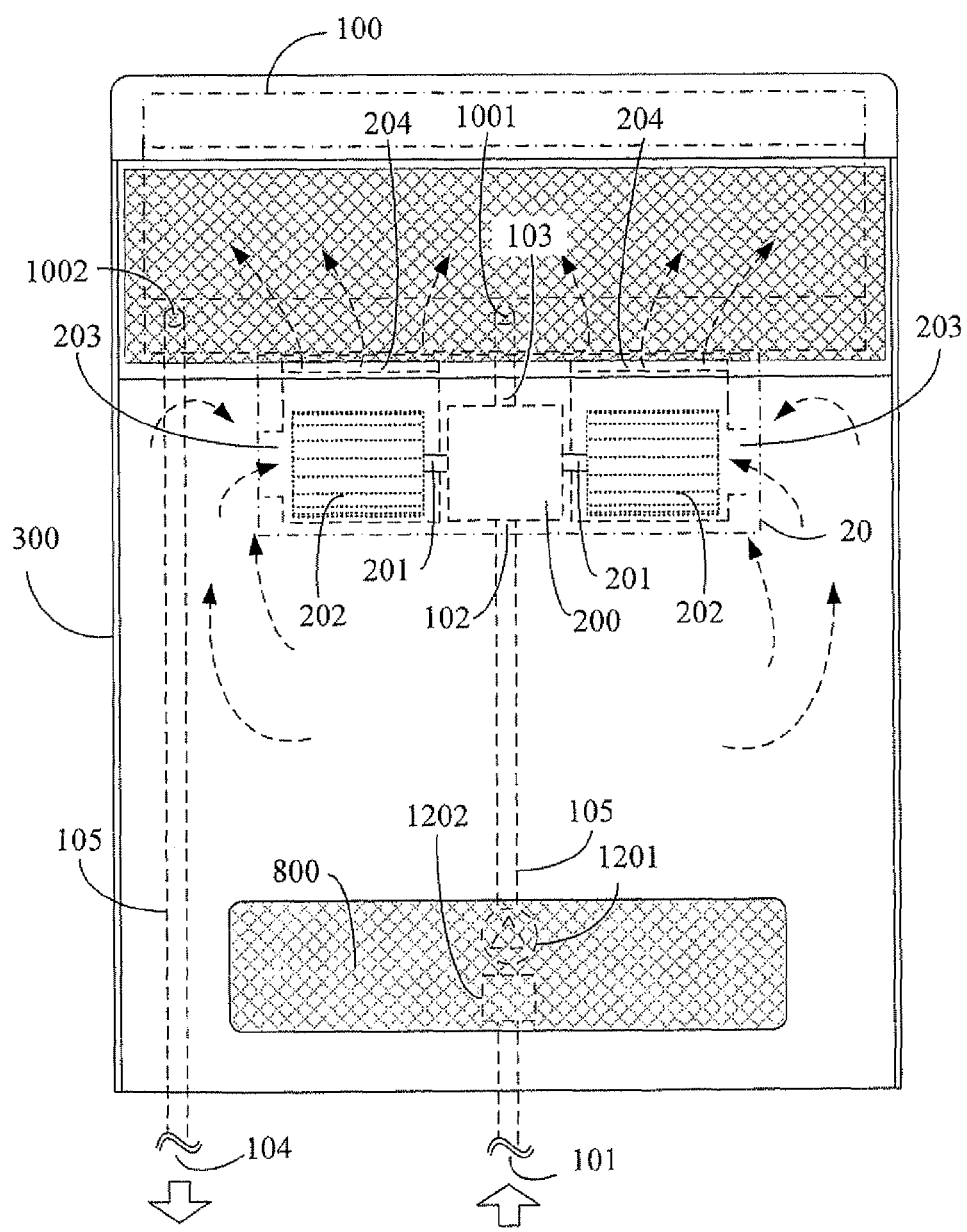
FIG. 4 is a front view of the embodiment disclosed in FIG. 3.
Figure 28:
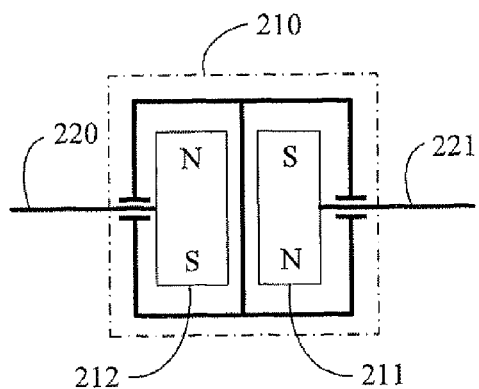
FIG. 28 is a schematic structural view showing a conventional magnetic non-contact insulation type transmission device (210).

Embodiments illustrating each application of the building warmed by pumped secondary fluid are as follows:

FIG. 1 is a lateral structural view showing the present invention being applied in a semi-opened building, wherein the heat exchanger (100) is installed in the flowpath structure (500) and close to the fluid actuation device assembly (20), according to one embodiment of the present invention;

FIG. 2 is a front view of the embodiment disclosed in FIG. 1;

AS shown in FIG. 1 and FIG. 2, the building warmed by pumped secondary fluid is structured through the fluid kinetic energy and thermal energy of a pressurized thermal energy source, which mainly consists of:

Heat exchanger (100): which is a heat exchanger made of a thermal conductive material, and constituted by a heat exchanger structure having flowpaths allowing the thermal energy fluid to pass through and capable of releasing the thermal energy to the secondary fluid passing through the exterior of the heat exchanger (100) at the same time, disposed vertically or obliquely at the location close to the fluid actuation device assembly (20) in the flowpath structure (500);

Thermal energy fluid inlet port of heat exchanger (1001): provided for inputting the fluid with thermal energy to the heat exchanger (100);

Thermal energy fluid outlet port of heat exchanger (1002): provided for outputting the fluid with thermal energy from the heat exchanger (100);

Fluid actuation device assembly (20): constituted by one or more than one of fluid actuation devices (200) and one or more than one of secondary fluid pump sets (202), and when the fluid actuation device (200) allows the pressurized thermal energy fluid to pass through, the fluid actuation device (200) is driven to output rotary kinetic energy through a rotation shaft (201), for directly driving the secondary fluid pump set (202) or through an input shaft of magnetic non-contact insulation type transmission device (220) of a magnetic non-contact insulation type transmission device (210) for driving the secondary fluid pump set (202);

Thermal energy fluid input port (101), thermal energy fluid outlet port (104): provided for inputting the thermal energy fluid capable of driving the fluid actuation device (200) of the fluid actuation device assembly (20), and enabling the heat exchanger (100) to perform cooling or heating;

Fluid inlet port of fluid actuation device (102), fluid outlet port of fluid actuation device (103): provided for inputting or outputting the thermal energy fluid passing the fluid actuation device (200), so as to output the rotary kinetic energy through the rotation shaft (201);

Thermal energy fluid pipeline (105): constituted by a thermal energy fluid pipeline structure selected according to the properties and temperature of the thermal energy fluid, for inputting the thermal energy fluid of a thermal energy fluid supply source from the thermal energy fluid inlet port (101) for being leaded to pass through the fluid actuation device (200) and the heat exchanger (100) then discharged from the thermal energy fluid outlet port (104), in which the heat exchanger (100) and the fluid actuation device (200) are connected by the thermal energy fluid pipeline (105), and thermal energy fluid flowpaths of the thermal energy fluid pipeline (105) for connecting the above two can be connected in series or in parallel, or in series and parallel;

Secondary fluid pump set (202): constituted by a blade set capable of rotating for pumping fluid, wherein the secondary fluid pump set (202) is directly driven by the rotation shaft (201) driven through the pressurized thermal energy fluid from the fluid actuation device (200), or the rotation shaft (201) inputs the rotary kinetic energy to the input shaft of magnetic non-contact insulation type transmission device (220) of the magnetic non-contact insulation type transmission device (210), and the output shaft of magnetic non-contact insulation type transmission device (221) of the magnetic non-contact insulation type transmission device (210) drives the secondary fluid pump set (202) for pumping the secondary fluid to be introduced from the secondary fluid inlet port of secondary fluid pump set (203) and be pumped out from the secondary fluid outlet port of secondary fluid pump set (204), a partition board (205) is installed between the secondary fluid inlet port of secondary fluid pump set (203) and the secondary fluid outlet port of secondary fluid pump set (204), the secondary fluid pumped from the secondary fluid outlet port of secondary fluid pump set (204) passes through the flowpath structure of secondary fluid (500), the flow guide plate of secondary fluid (600), the heat exchanger (100) and the secondary fluid outlet port (750) for allowing the thermal energy fluid to release thermal energy to the secondary fluid via the heat exchanger (100);

Semi-opened building (300): constituted by at least a lateral-side building structure and a top-side building structure for being installed with the heat exchanger (100), the fluid actuation device assembly (20) containing the fluid actuation device (200) and the secondary fluid pump set (202), the thermal energy fluid pipeline (105), the flowpath structure of secondary fluid (500), the flow guide plate of secondary fluid (600) and the secondary fluid inlet port (700), thereby to structure the building warmed by pumped secondary fluid, and to form the circulative pumping of partial secondary fluid;

Secondary fluid flowpath structure (500): configured by the internal structure of semi-opened building (300) or fluid pipelines which are additionally installed, for guiding the secondary fluid pumped by the secondary fluid pump set (202) to pass through the flow guide plate of secondary fluid (600), the heat exchanger (100) and the secondary fluid outlet port (750) to enter the temperature differentiation body space allowing the secondary fluid to be pumped in and formed in the interior of semi-opened building (300), wherein a part of the thermal energy fluid returns from the secondary fluid inlet port (700) back to the secondary fluid inlet port (700) of the secondary fluid pump set (202);

Flow guide plate of secondary fluid (600): constituted by one or more than one board-like or plate-like or having flow guide oblique surfaces flow direction guiding structures of secondary fluid, for being installed in the flowpath structure (500) disposed at both ends or at least one end of the secondary fluid inlet end (110) of the heat exchanger (100) or the secondary fluid outlet end (120) of the heat exchanger (100), for shunting the secondary fluid such that the secondary fluid can evenly pass through the heat exchanger (100) and enter to the temperature differentiation space of the semi-opened building (300);

Secondary fluid inlet port (700): constituted by a building structure installed between the temperature differentiation space of the semi-opened building (300) and the secondary fluid inlet port of secondary pump set (203), for receiving the external secondary fluid or receiving a part of the secondary fluid having thermal energy to return to the secondary fluid inlet port of secondary fluid pump set (203);

FIG. 3 is a lateral structural view showing the present invention being applied in a semi-opened building, wherein the heat exchanger (100) being installed in the flowpath structure (500) and close to the secondary fluid outlet port (750), according to one embodiment of the present invention;

FIG. 4 is a front view of the embodiment disclosed in FIG. 3;

As shown in FIG. 3 and FIG. 4, the building warmed by pumped warmed by pumped secondary fluid is structured through the fluid kinetic energy and thermal energy of a pressurized thermal energy source, which mainly consists of:

Heat exchanger (100): which is a heat exchanger made of a thermal conductive material, and constituted by a heat exchanger structure having flowpaths allowing the thermal energy fluid to pass through and capable of releasing the thermal energy to the secondary fluid passing through the exterior of the heat exchanger (100) at the same time, disposed horizontally or almost horizontally at the location close to the secondary fluid outlet port (750) in the flowpath structure of secondary fluid (500);

Thermal energy fluid inlet port of heat exchanger (1001): provided for inputting the fluid with thermal energy to the heat exchanger (100);

Thermal energy fluid outlet port of heat exchanger (1002): provided for outputting the fluid with thermal energy from the heat exchanger (100);

Fluid actuation device assembly (20): constituted by one or more than one of fluid actuation devices (200) and one or more than one of secondary fluid pump sets (202), and when the fluid actuation device (200) allows the pressurized thermal energy fluid to pass through, the fluid actuation device (200) is driven to output rotary kinetic energy through a rotation shaft (201), for directly driving the secondary fluid pump set (202) or through an input shaft of magnetic non-contact insulation type transmission device (220) of a magnetic non-contact insulation type transmission device (210) for driving the secondary fluid pump set (202);

Thermal energy fluid input port (101), thermal energy fluid outlet port (104): provided for inputting the thermal energy fluid capable of driving the fluid actuation device (200) of the fluid actuation device assembly (20), and enabling the heat exchanger (100) to perform cooling or heating;

Fluid inlet port of fluid actuation device (102), fluid outlet port of fluid actuation device (103): provided for inputting or outputting the thermal energy fluid passing the fluid actuation device (200), so as to output the rotary kinetic energy through the rotation shaft (201);

Thermal energy fluid pipeline (105): constituted by a thermal energy fluid pipeline structure selected according to the properties and temperature of the thermal energy fluid, for inputting the thermal energy fluid of a thermal energy fluid supply source from the thermal energy fluid inlet port (101) for being leaded to pass through the fluid actuation device (200) and the heat exchanger (100) then discharged from the thermal energy fluid outlet port (104), in which the heat exchanger (100) and the fluid actuation device (200) are connected by the thermal energy fluid pipeline (105), and thermal energy fluid flowpaths of the thermal energy fluid pipeline (105) for connecting the above two can be connected in series or in parallel, or in series and parallel;

Secondary fluid pump set (202): constituted by a blade set capable of rotating for pumping fluid, wherein the secondary fluid pump set (202) is directly driven by the rotation shaft (201) driven through the pressurized thermal energy fluid from the fluid actuation device (200) or, as shown in FIG. 28, the rotation shaft (201) inputs the rotary kinetic energy to the input shaft (220) of a magnetic non-contact insulation type transmission device (210), and the output shaft (221) of magnetic non-contact insulation type transmission device (210) to drive the secondary fluid pump set (202) for pumping the secondary fluid to be introduced from the secondary fluid inlet port of secondary fluid pump set (203) and be pumped out from the secondary fluid outlet port of secondary fluid pump set (204), a partition board (205) is installed between the secondary fluid inlet port of secondary fluid pump set (203) and the secondary fluid outlet port of secondary fluid pump set (204), the secondary fluid pumped from the secondary fluid outlet port of secondary fluid pump set (204) passes through the flowpath structure of secondary fluid (500), the flow guide plate of secondary fluid (600), the heat exchanger (100) and the secondary fluid outlet port (750) for allowing the thermal energy fluid to release thermal energy to the secondary fluid via the heat exchanger (100).

Figure 5:
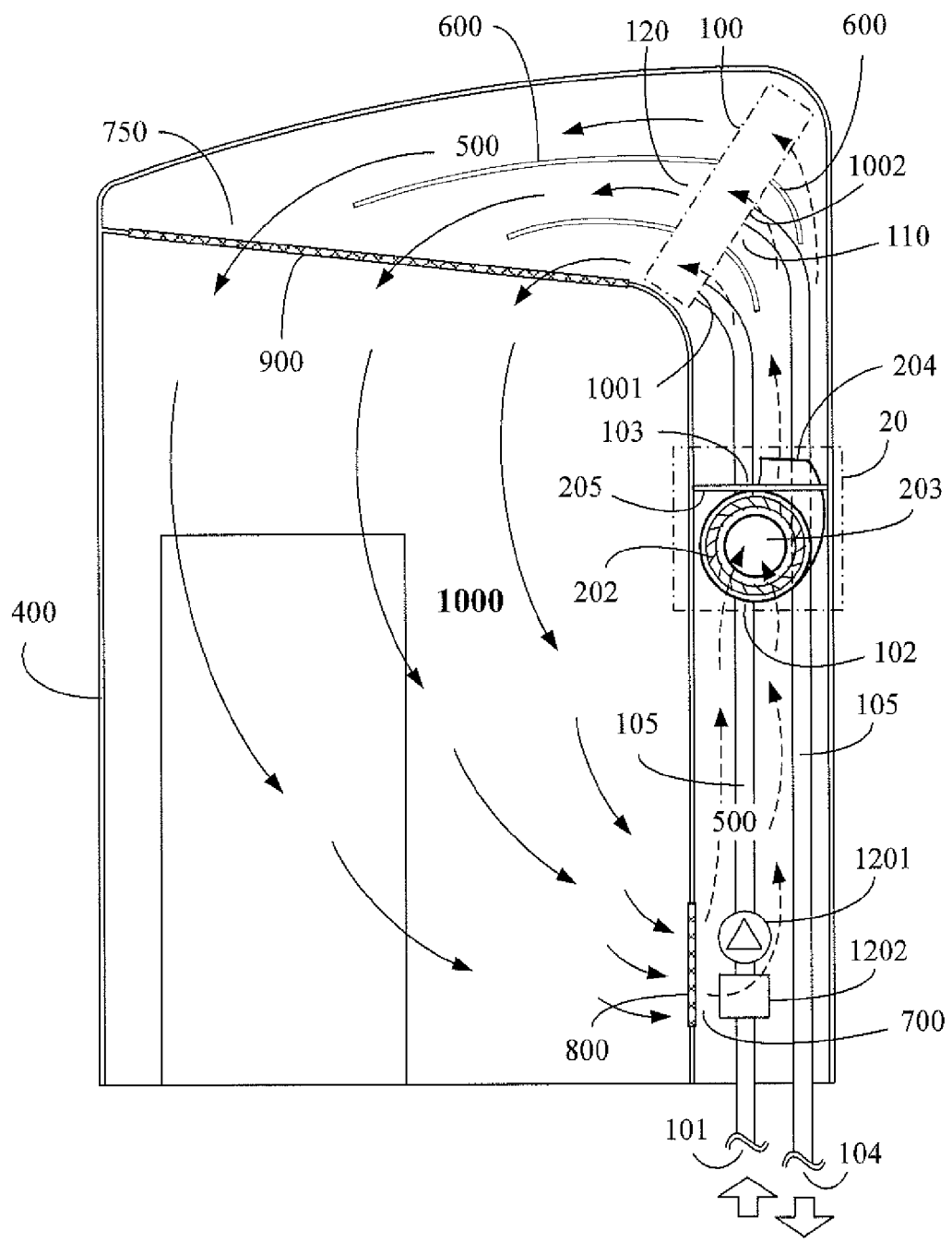
FIG. 5 is a lateral structural view showing the present invention being applied in a closed type building, wherein the heat exchanger (100) being installed in the flowpath structure (500) and close to the fluid actuation device assembly (20), according to one embodiment of the present invention.
Figure 6:
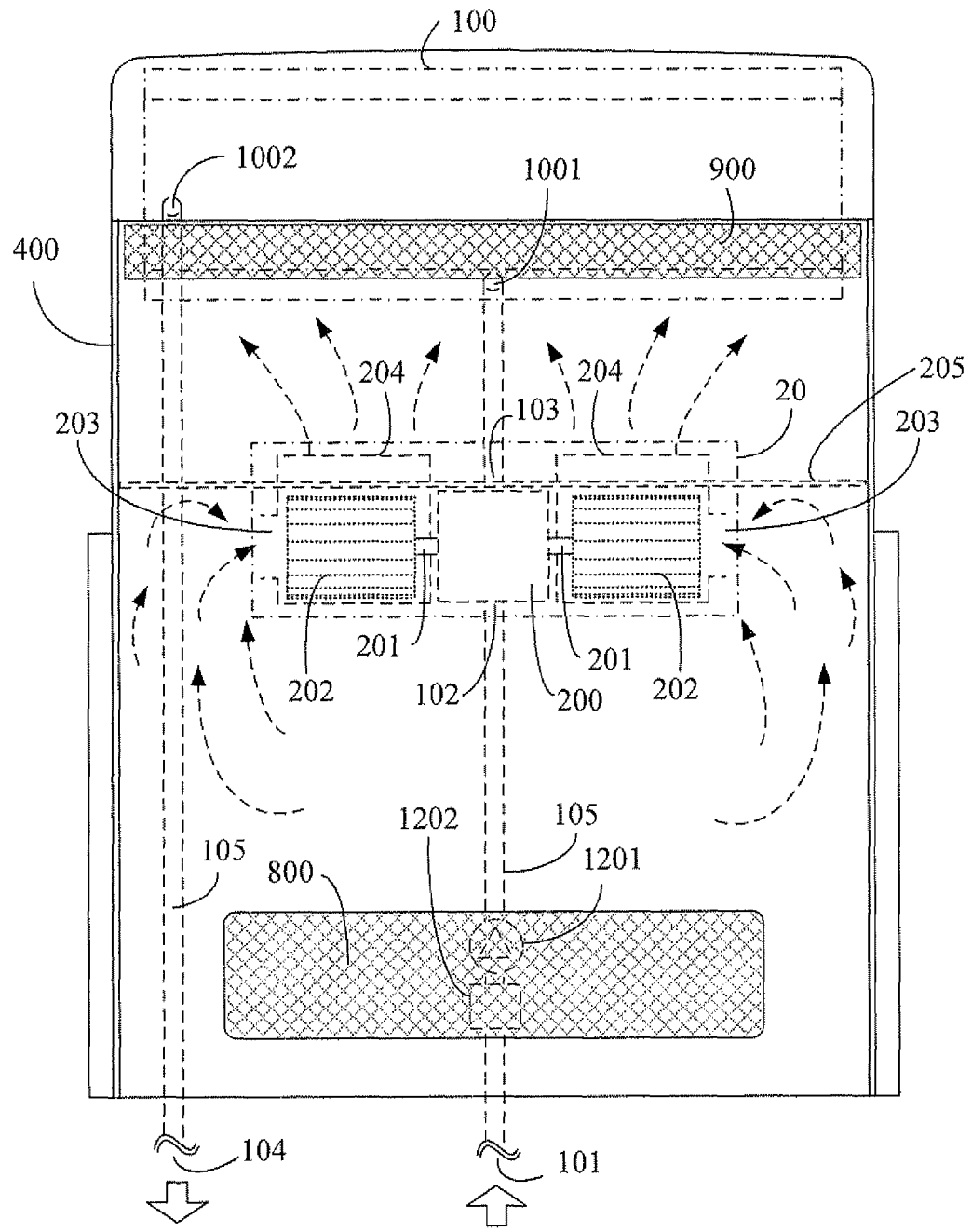
FIG. 6 is a front view of the embodiment disclosed in FIG. 5.
Figure 7:
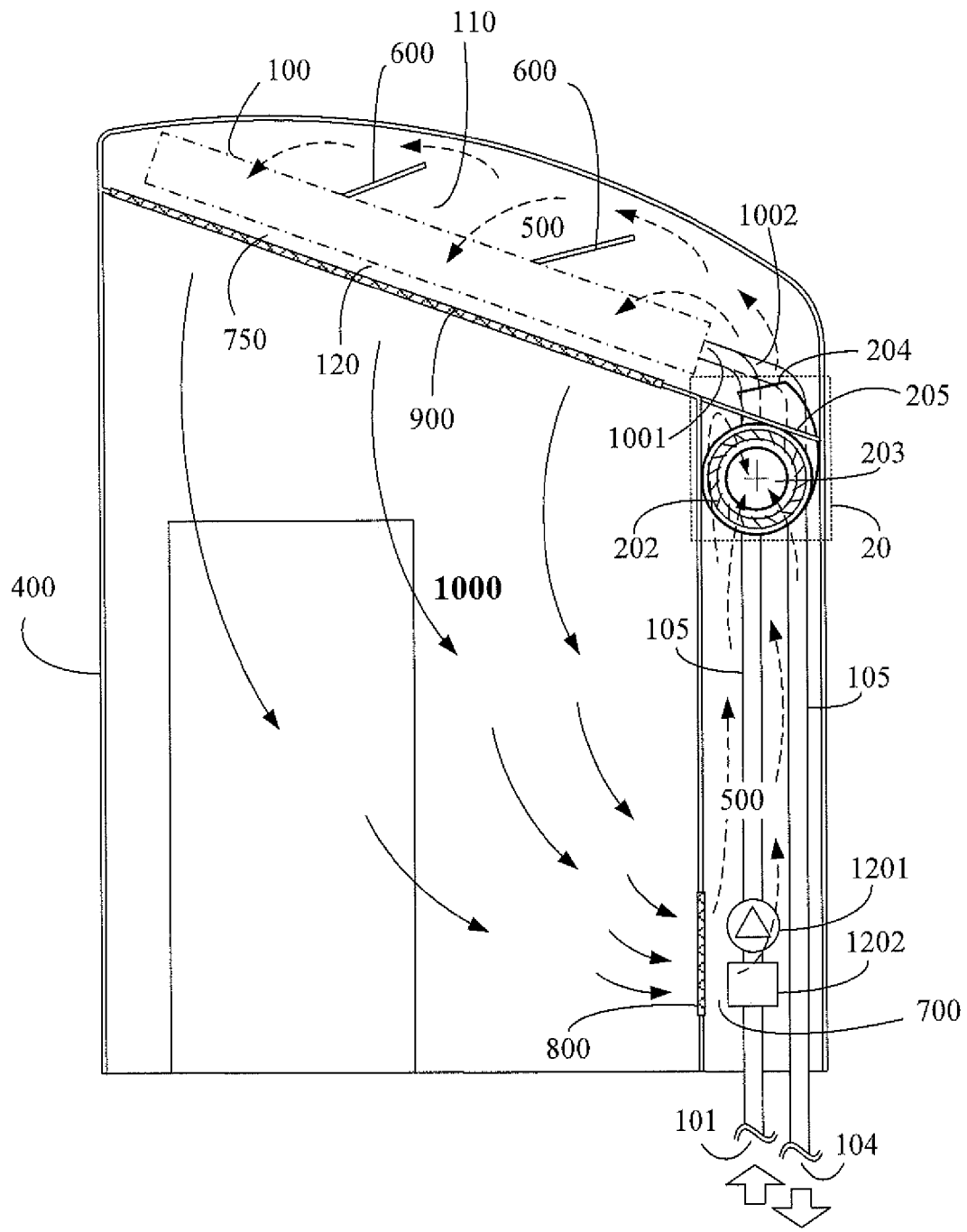
FIG. 7 is a lateral structural view showing the present invention being applied in a closed type building, wherein the heat exchanger (100) being installed in the flowpath structure (500) and close to the secondary fluid outlet port (750), according to one embodiment of the present invention.
Figure 8:
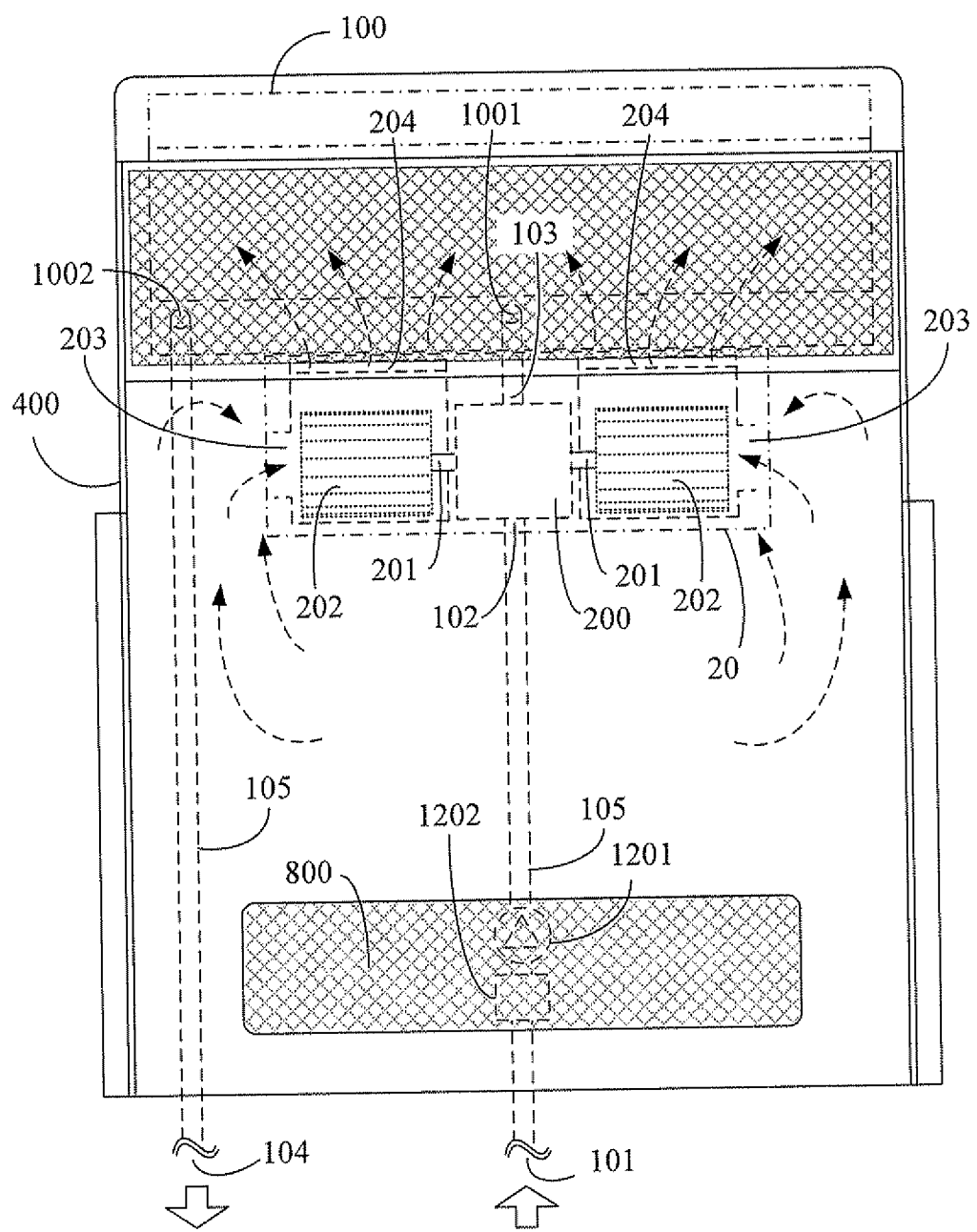
FIG. 8 is a front view of the embodiment disclosed in FIG. 7.
Figure 9:
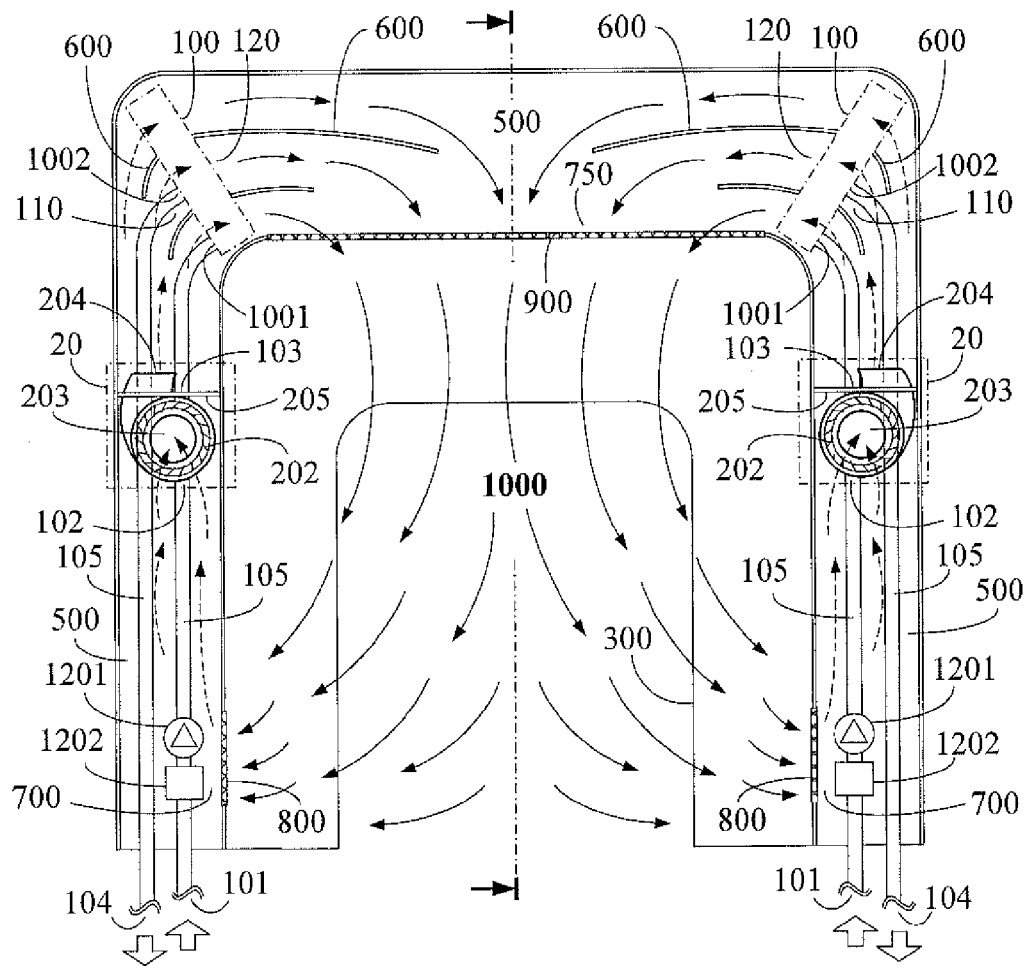
FIG. 9 is a schematic view showing plural sets of the structure disclosed in FIG. 1 being installed, according to one embodiment of the present invention.
Figure 10:
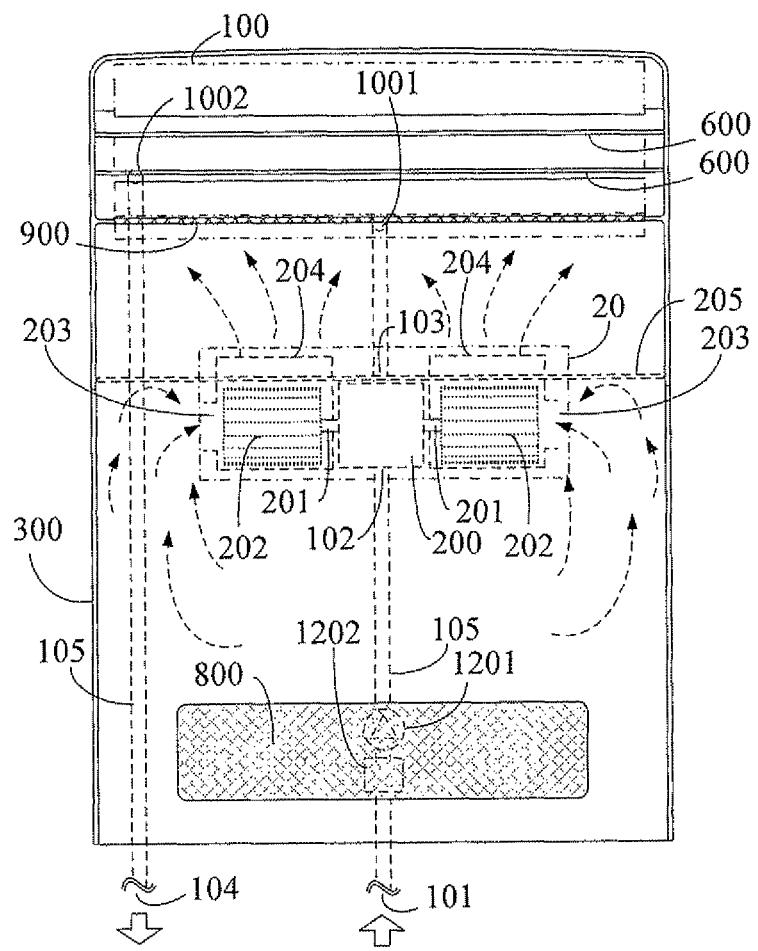
FIG. 10 is a front view of the embodiment disclosed in FIG. 9.
Figure 11:
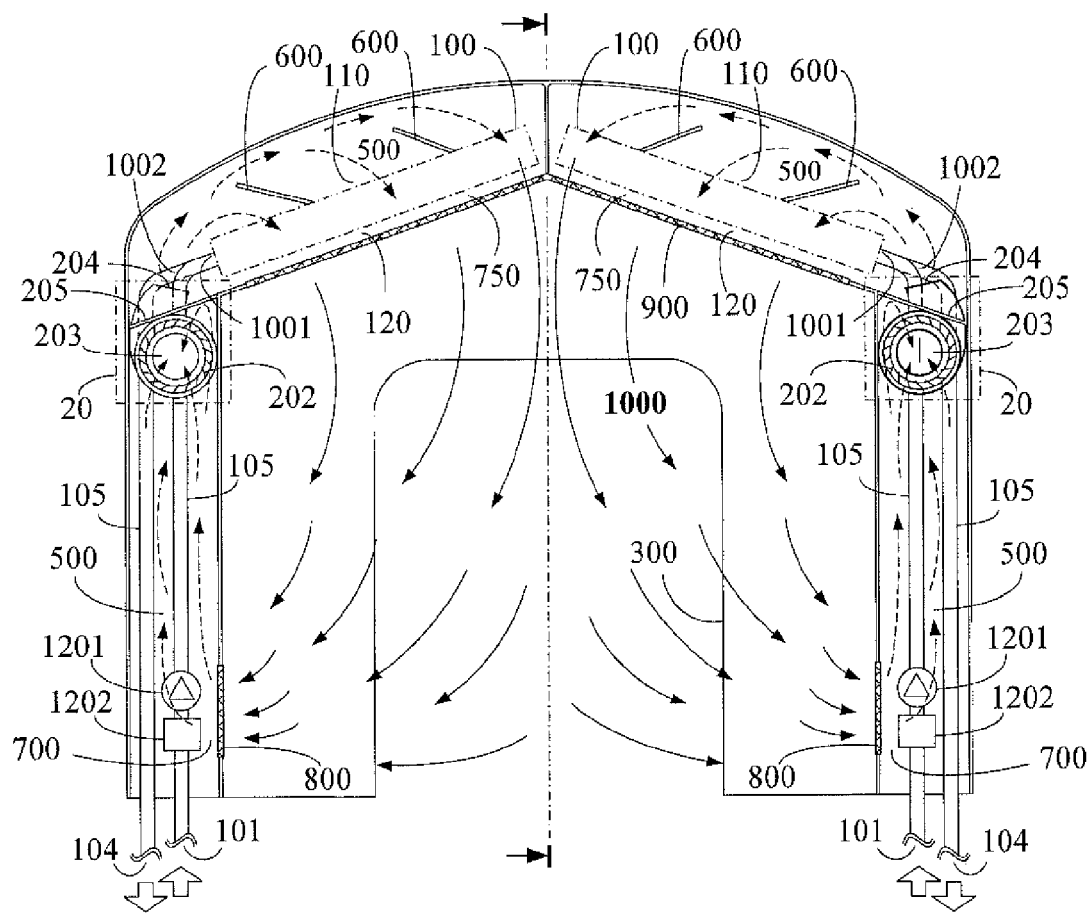
FIG. 11 is a schematic view showing plural sets of the structure disclosed in FIG. 3 being installed, according to one embodiment of the present invention.
Figure 12:
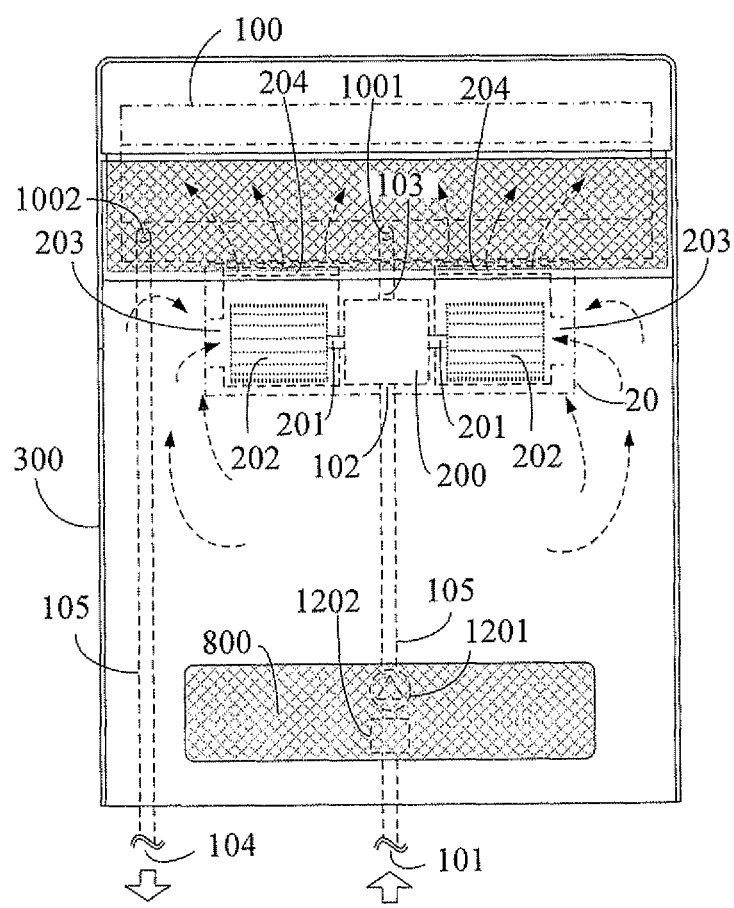
FIG. 12 is a front view of the embodiment disclosed in FIG. 11.
Figure 13:
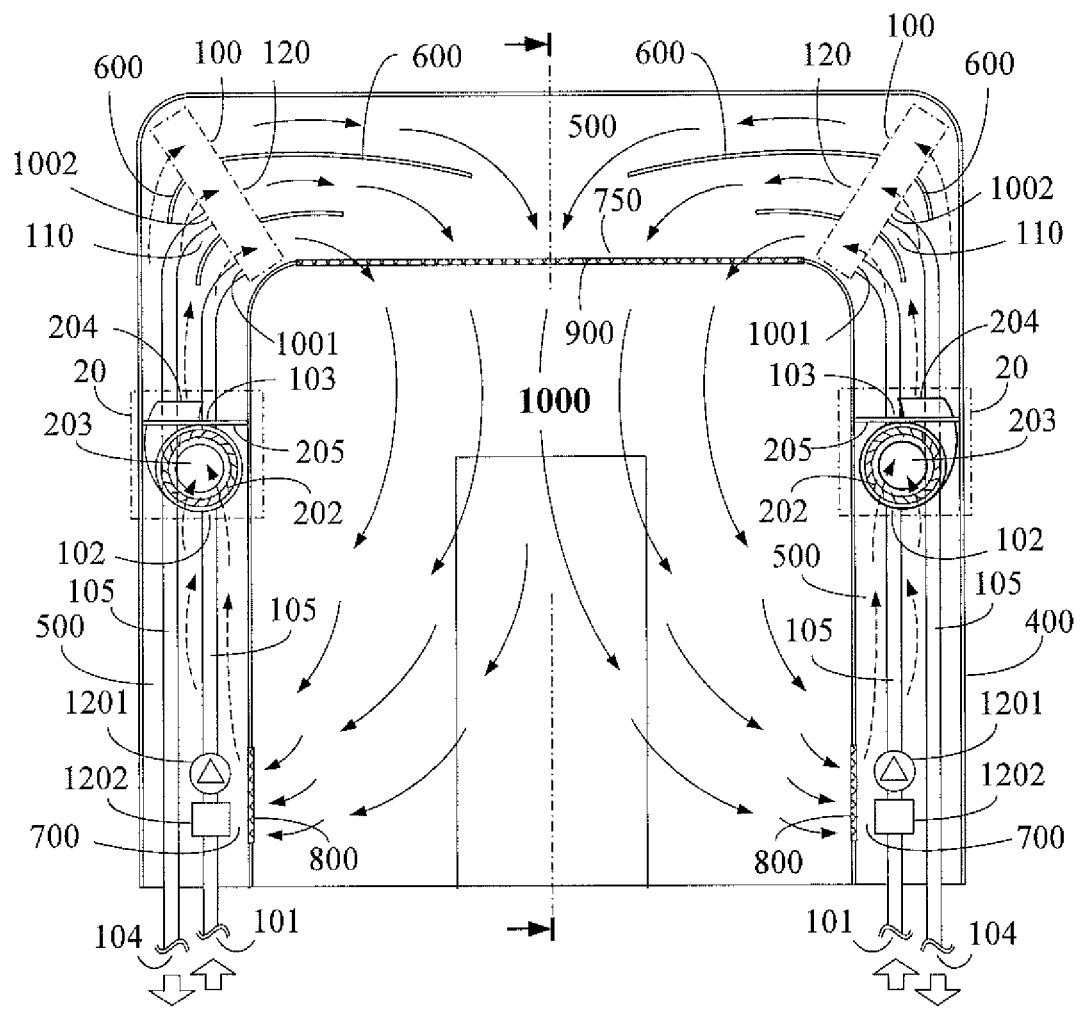
FIG. 13 is a schematic view showing plural sets of the structure disclosed in FIG. 5 being installed, according to one embodiment of the present invention.
Figure 14:
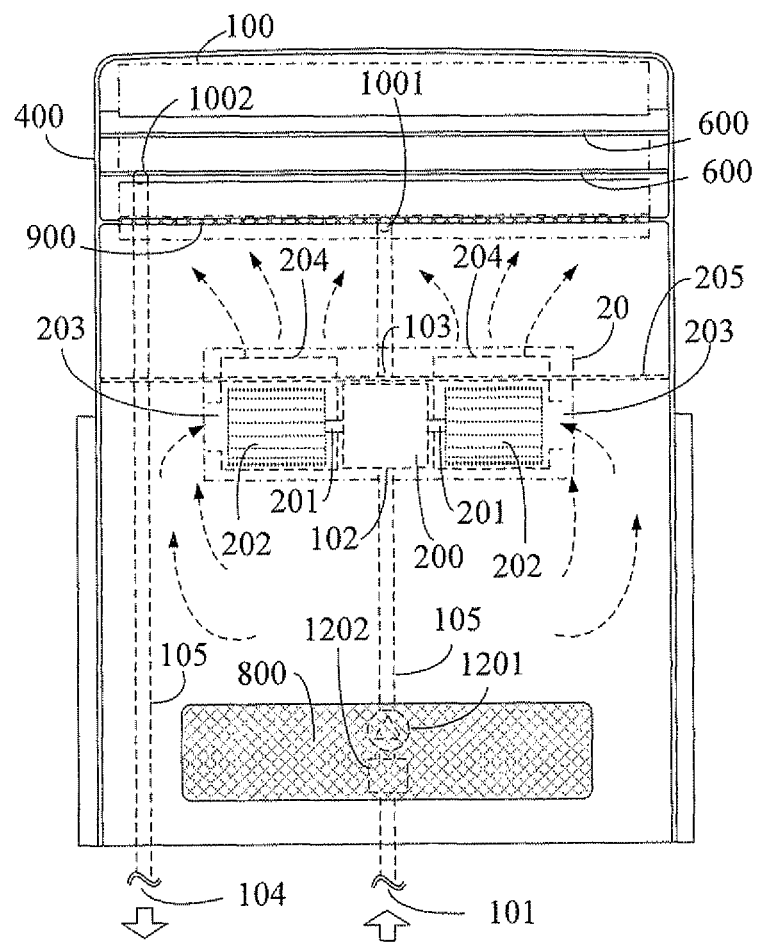
FIG. 14 is a front view of the embodiment disclosed in FIG. 13.
Figure 15:
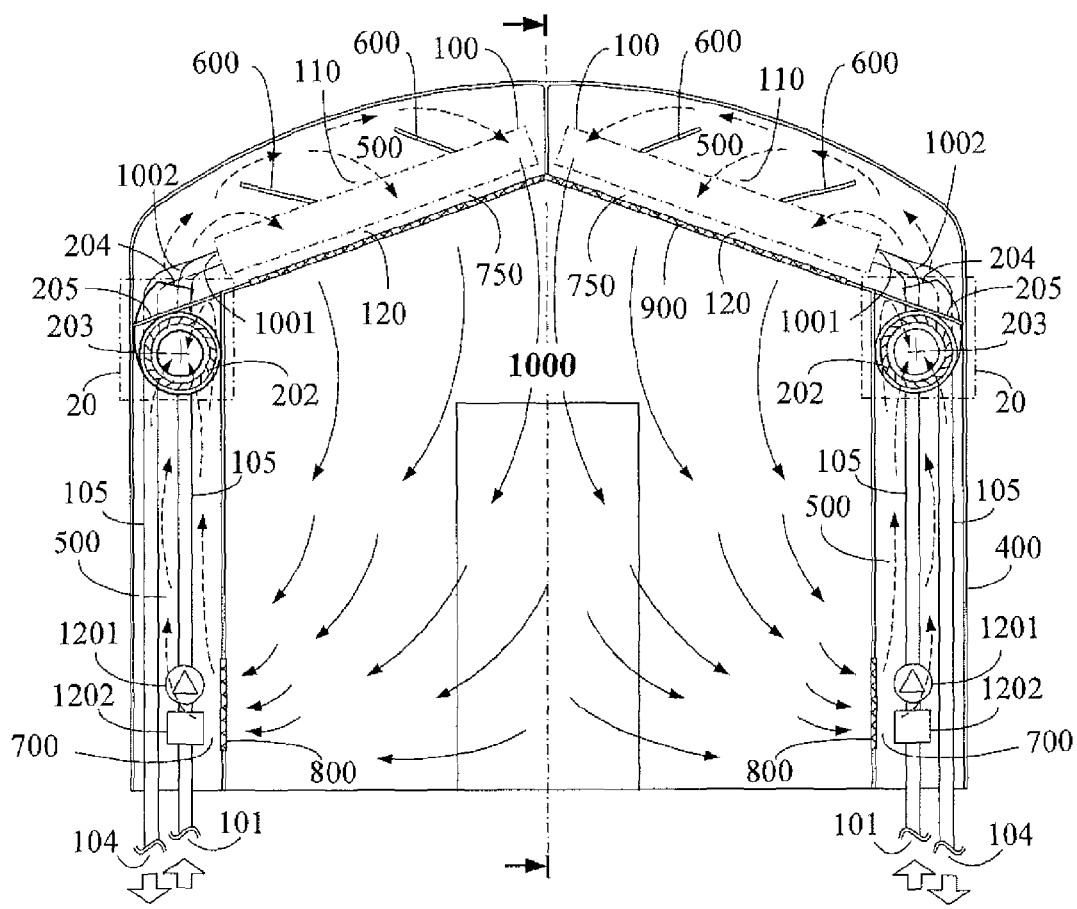
FIG. 15 is a schematic view showing plural sets of the structure disclosed in FIG. 7 being installed, according to one embodiment of the present invention.
Figure 16:
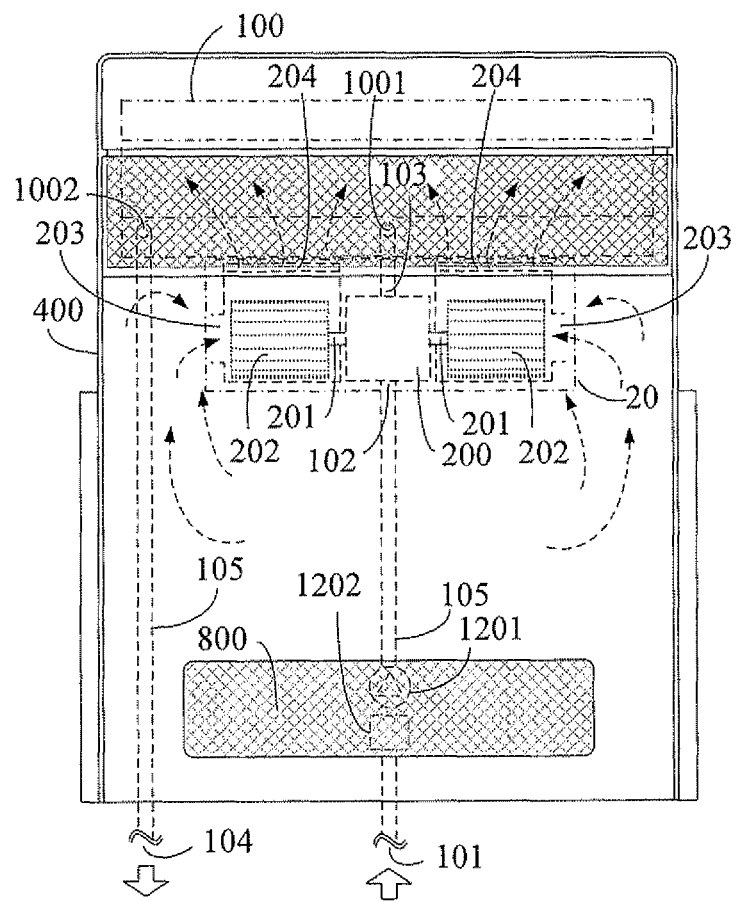
FIG. 16 is a front view of the embodiment disclosed in FIG. 15.
Figure 17:
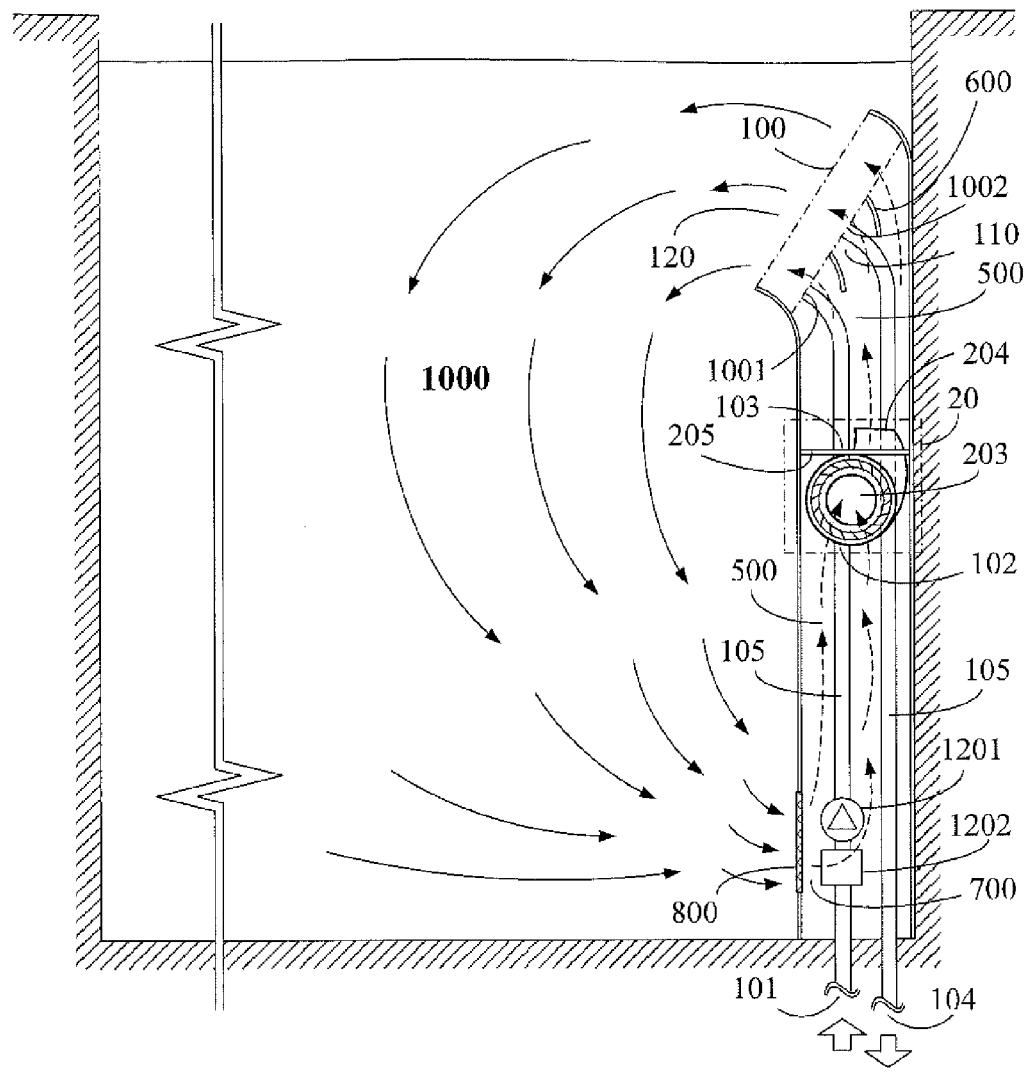
FIG. 17 is a schematic view showing the present invention being applied in the secondary fluid in a tubular or pool-shaped or tank-shaped semi-opened building, or a lake, or river, or ocean, and the heat exchanger (100) being installed in the flowpath structure (500) and close to the fluid actuation device assembly (20).

Semi-opened building (300): constituted by at least a lateral-side building structure and a top-side building structure for being installed with the heat exchanger (100), the fluid actuation device assembly (20) containing the fluid actuation device (200) and the secondary fluid pump set (202), the thermal energy fluid pipeline (105), the flowpath structure (500), the flow guide plate (600) and the secondary fluid inlet port (700), thereby to structure the building warmed by pumped warmed by pumped secondary fluid, and to form the circulative pumping of partial secondary fluid;

Flowpath structure (500): configured by the internal structure of semi-opened building (300) or fluid pipelines which are additionally installed, for guiding the secondary fluid pumped by the secondary fluid pump set (202) to pass through the flow guide plate (600), the heat exchanger (100) and the secondary fluid outlet port (750) to enter the temperature differentiation body space allowing the secondary fluid to be pumped in and formed in the interior of semi-opened building (300), wherein a part of the thermal energy fluid returns from the secondary fluid inlet port (700) back to the secondary fluid inlet port (700) of the secondary fluid pump set (202);

Flow guide plate (600): constituted by one or more than one board-like or plate-like or having flow guide oblique surfaces flow direction guiding structures of secondary fluid, for being installed in the flowpath structure (500) disposed at both ends or at least one end of the secondary fluid inlet end (110) of the heat exchanger (100) or the secondary fluid outlet end (120) of the heat exchanger (100), for shunting the secondary fluid such that the secondary fluid can evenly pass through the heat exchanger (100) and enter to the temperature differentiation space of the semi-opened building (300);

Secondary fluid inlet port (700): constituted by a building structure installed between the temperature differentiation space of the semi-opened building (300) and the secondary fluid inlet port of secondary pump set (203), for receiving the external secondary fluid or receiving a part of the secondary fluid having thermal energy to return to the secondary fluid inlet port of secondary fluid pump set (203);

FIG. 5 is a lateral structural view showing the present invention being applied in a closed type building, wherein the heat exchanger (100) being installed in the flowpath structure (500) and close to the fluid actuation device assembly (20), according to one embodiment of the present invention;

FIG. 6 is a front view of the embodiment disclosed in FIG. 5;

AS shown in FIG. 5 and FIG. 6, the building warmed by pumped warmed by pumped secondary fluid is structured through the flowing kinetic energy and thermal energy of a pressurized thermal energy source, which mainly consists of:

Heat exchanger (100): which is a heat exchanger made of a thermal conductive material, and constituted by a heat exchanger structure having flowpaths allowing the thermal energy fluid to pass through and capable of releasing the thermal energy to the secondary fluid passing through the exterior of the heat exchanger (100) at the same time, disposed vertically or obliquely at the location close to the fluid actuation device assembly (20) in the flowpath structure (500);

Thermal energy fluid inlet port of heat exchanger (1001): provided for inputting the fluid with thermal energy to the heat exchanger (100);

Thermal energy fluid outlet port of heat exchanger (1002): provided for outputting the fluid with thermal energy from the heat exchanger (100);

Fluid actuation device assembly (20): constituted by one or more than one of fluid actuation devices (200) and one or more than one of secondary fluid pump sets (202), and when the fluid actuation device (200) allows the pressurized thermal energy fluid to pass through, the fluid actuation device (200) is driven to output rotary kinetic energy through a rotation shaft (201), for directly driving the secondary fluid pump set (202) or through an input shaft of magnetic non-contact insulation type transmission device (220) of a magnetic non-contact insulation type transmission device (210) for driving the secondary fluid pump set (202);

Thermal energy fluid input port (101), thermal energy fluid outlet port (104): provided for inputting the thermal energy fluid capable of driving the fluid actuation device (200) of the fluid actuation device assembly (20), and enabling the heat exchanger (100) to perform cooling or heating;

Fluid inlet port of fluid actuation device (102), fluid outlet port of fluid actuation device (103): provided for inputting or outputting the thermal energy fluid passing the fluid actuation device (200), so as to output the rotary kinetic energy through the rotation shaft (201);

Thermal energy fluid pipeline (105): constituted by a thermal energy fluid pipeline structure selected according to the properties and temperature of the thermal energy fluid, for inputting the thermal energy fluid of a thermal energy fluid supply source from the thermal energy fluid inlet port (101) for being leaded to pass through the fluid actuation device (200) and the heat exchanger (100) then discharged from the thermal energy fluid outlet port (104), in which the heat exchanger (100) and the fluid actuation device (200) are connected by the thermal energy fluid pipeline (105), and thermal energy fluid flowpaths of the thermal energy fluid pipeline (105) for connecting the above two can be connected in series or in parallel, or in series and parallel;

Secondary fluid pump set (202): constituted by a blade set capable of rotating for pumping fluid, wherein the secondary fluid pump set (202) is directly driven by the rotation shaft (201) driven through the pressurized thermal energy fluid from the fluid actuation device (200), or the rotation shaft (201) inputs the rotary kinetic energy to the input shaft of magnetic non-contact insulation type transmission device (220) of the magnetic non-contact insulation type transmission device (210), and the output shaft of magnetic non-contact insulation type transmission device (221) of the magnetic non-contact insulation type transmission device (210) drives the secondary fluid pump set (202) for pumping the secondary fluid to be introduced from the secondary fluid inlet port of secondary fluid pump set (203) and be pumped out from the secondary fluid outlet port of secondary fluid pump set (204), a partition board (205) is installed between the secondary fluid inlet port of secondary fluid pump set (203) and the secondary fluid outlet port of secondary fluid pump set (204), the secondary fluid pumped from the secondary fluid outlet port of secondary fluid pump set (204) passes through the flowpath structure (500), the flow guide plate (600), the heat exchanger (100) and the secondary fluid outlet port (750) for allowing the thermal energy fluid to release thermal energy to the secondary fluid via the heat exchanger (100);

Closed type building (400): constituted by a closed structure, having a tubular, or spherical, or tank-shaped, or storage room, or cabinet-like sealed building formed with a space for accommodating the secondary fluid, wherein the interior being installed with the heat exchanger (100), the fluid actuation device assembly (20) containing the fluid actuation device (200) and the secondary fluid pump set (202), the thermal energy fluid pipeline (105), the flowpath structure (500), the flow guide plate (600) and the secondary fluid inlet port (700), thereby to structure the building warmed by pumped secondary fluid, and to form the partial circulative pumping of the secondary fluid;

Flowpath structure (500): configured by the internal structure of closed type building (400) or fluid pipelines which are additionally installed, for guiding the secondary fluid pumped by the secondary fluid pump set (202) to pass through the flow guide plate (600), the heat exchanger (100) and the secondary fluid outlet port (750) to enter the temperature differentiation body space allowing the secondary fluid to be pumped in and formed in the interior of closed type building (400), wherein a part of the thermal energy fluid returns from the secondary fluid inlet port (700) back to the secondary fluid inlet port (700) of the secondary fluid pump set (202);

Flow guide plate (600): constituted by one or more than one board-like or plate-like or having flow guide oblique surfaces flow direction guiding structures of secondary fluid, for being installed in the flowpath structure (500) disposed at both ends or at least one end of the secondary fluid inlet end (110) of the heat exchanger (100) or the secondary fluid outlet end (120) of the heat exchanger (100), for shunting the secondary fluid such that the secondary fluid can evenly pass through the heat exchanger (100) and enter to the temperature differentiation space of the close-type building (400);

Secondary fluid inlet port (700): constituted by a building structure installed between the temperature differentiation space of the closed type building (400) and the secondary fluid inlet port of secondary pump set (203), for receiving a part of the secondary fluid having thermal energy to return to the secondary fluid inlet port of secondary fluid pump set (203);

FIG. 7 is a lateral structural view showing the present invention being applied in a closed type building, wherein the heat exchanger (100) being installed in the flowpath structure (500) and close to the secondary fluid outlet port (750), according to one embodiment of the present invention;

FIG. 8 is a front view of the embodiment disclosed in FIG. 7;

AS shown in FIG. 7 and FIG. 8, the building warmed by pumped secondary fluid is structured through the fluid kinetic energy and thermal energy of a pressurized thermal energy source, which mainly consists of:

Heat exchanger (100): which is a heat exchanger made of a thermal conductive material, and constituted by a heat exchanger structure having flowpaths allowing the thermal energy fluid to pass through and capable of releasing the thermal energy to the secondary fluid passing through the exterior of the heat exchanger (100) at the same time, disposed horizontally or almost horizontally at the location close to the secondary fluid outlet port (750) in the flowpath structure (500);

Thermal energy fluid inlet port of heat exchanger (1001): provided for inputting the fluid with thermal energy to the heat exchanger (100);

Thermal energy fluid outlet port of heat exchanger (1002): provided for outputting the fluid with thermal energy from the heat exchanger (100);

Fluid actuation device assembly (20): constituted by one or more than one of fluid actuation devices (200) and one or more than one of secondary fluid pump sets (202), and when the fluid actuation device (200) allows the pressurized thermal energy fluid to pass through, the fluid actuation device (200) is driven to output rotary kinetic energy through a rotation shaft (201), for directly driving the secondary fluid pump set (202) or through an input shaft of magnetic non-contact insulation type transmission device (220) of a magnetic non-contact insulation type transmission device (210) for driving the secondary fluid pump set (202);

Thermal energy fluid input port (101), thermal energy fluid outlet port (104): provided for inputting the thermal energy fluid capable of driving the fluid actuation device (200) of the fluid actuation device assembly (20), and enabling the heat exchanger (100) to perform cooling or heating;

Fluid inlet port of fluid actuation device (102), fluid outlet port of fluid actuation device (103): provided for inputting or outputting the thermal energy fluid passing the fluid actuation device (200), so as to output the rotary kinetic energy through the rotation shaft (201);

Thermal energy fluid pipeline (105): constituted by a thermal energy fluid pipeline structure selected according to the properties and temperature of the thermal energy fluid, for inputting the thermal energy fluid of a thermal energy fluid supply source from the thermal energy fluid inlet port (101) for being leaded to pass through the fluid actuation device (200) and the heat exchanger (100) then discharged from the thermal energy fluid outlet port (104), in which the heat exchanger (100) and the fluid actuation device (200) are connected by the thermal energy fluid pipeline (105), and thermal energy fluid flowpaths of the thermal energy fluid pipeline (105) for connecting the above two can be connected in series or in parallel, or in series and parallel;

Secondary fluid pump set (202): constituted by a blade set capable of rotating for pumping fluid, wherein the secondary fluid pump set (202) is directly driven by the rotation shaft (201) driven through the pressurized thermal energy fluid from the fluid actuation device (200), or the rotation shaft (201) inputs the rotary kinetic energy to the input shaft of magnetic non-contact insulation type transmission device (220) of the magnetic non-contact insulation type transmission device (210), and the output shaft of magnetic non-contact insulation type transmission device (221) of the magnetic non-contact insulation type transmission device (210) drives the secondary fluid pump set (202) for pumping the secondary fluid to be introduced from the secondary fluid inlet port of secondary fluid pump set (203) and be pumped out from the secondary fluid outlet port of secondary fluid pump set (204), a partition board (205) is installed between the secondary fluid inlet port of secondary fluid pump set (203) and the secondary fluid outlet port of secondary fluid pump set (204), the secondary fluid pumped from the secondary fluid outlet port of secondary fluid pump set (204) passes through the flowpath structure of secondary fluid (500), the flow guide plate (600), the heat exchanger (100) and the secondary fluid outlet port (750) for allowing the thermal energy fluid to release thermal energy to the secondary fluid via the heat exchanger (100);

Closed type building (400): constituted by a closed structure, having a tubular, or spherical, or tank-shaped, or storage room, or cabinet-like sealed building formed with a space for receiving the secondary fluid, wherein the interior being installed with the heat exchanger (100), the fluid actuation device assembly (20) containing the fluid actuation device (200) and the secondary fluid pump set (202), the thermal energy fluid pipeline (105), the flowpath structure (500), the flow guide plate (600) and the secondary fluid inlet port (700), thereby to structure the building warmed by pumped secondary fluid, and to form the circulative pumping of partial secondary fluid;

Flowpath structure (500): configured by the internal structure of closed type building (400) or fluid pipelines which are additionally installed, for guiding the secondary fluid pumped by the secondary fluid pump set (202) to pass through the flow guide plate (600), the heat exchanger (100) and the secondary fluid outlet port (750) to enter the temperature differentiation body space allowing the secondary fluid to be pumped in and formed in the interior of closed type building (400), wherein a part of the thermal energy fluid returns from the secondary fluid inlet port (700) back to the secondary fluid inlet port (700) of the secondary fluid pump set (202);

Flow guide plate (600): constituted by one or more than one board-like or plate-like or having flow guide oblique surfaces flow direction guiding structures of secondary fluid, for being installed in the flowpath structure (500) disposed at both ends or at least one end of the secondary fluid inlet end (110) of the heat exchanger (100) or the secondary fluid outlet end (120) of the heat exchanger (100), for shunting the secondary fluid such that the secondary fluid can evenly pass through the heat exchanger (100) and enter to the temperature differentiation space of the closed type building (400);

Secondary fluid inlet port (700): constituted by a building structure installed between the temperature differentiation space of the closed type building (400) and the secondary fluid inlet port of secondary pump set (203), for receiving a part of the secondary fluid having thermal energy to return to the secondary fluid inlet port of secondary fluid pump set (203);

According to the building warmed by pumped secondary fluid provided by the present invention, the secondary fluid is configured by liquid fluid, and the thermal energy fluid can be gaseous or liquid thermal energy fluid, and disposed in a tank-shaped, pool-shaped or sealed space;

According to the building warmed by pumped secondary fluid provided by the present invention, one or both of the secondary fluid inlet port (700) and the secondary fluid outlet port (750) can be further installed with an inlet port protection net (800), or an outlet port protection net (900);

According to the building warmed by pumped secondary fluid provided by the present invention, the thermal energy fluid from the thermal energy fluid source can be further in series installed with a thermal energy fluid pump (1201) having the function of boosting the fluid pressure;

According to the building warmed by pumped secondary fluid provided by the present invention, the thermal energy fluid pipeline (105) can be further in series installed with a flow regulation valve of thermal energy fluid (1202) for regulating the flow amount of thermal energy fluid;

Based on what are disclosed from FIG. 1 to FIG. 8, a same building can be provided with two or more than two sets of thermally actuated and pumped secondary fluid systems, which includes two or more than two sets of heat exchangers with flowpath (100), fluid actuation device assemblies (20) containing fluid actuation devices (200) and secondary fluid pump sets (202), thermal energy fluid pipelines (105), flowpath structures (500), flow guide plates (600) and secondary fluid inlet ports (700), thereby to structure the building warmed by pumped secondary fluid, and to form the circulative pumping of partial secondary fluid;

FIG. 9 is a schematic view showing plural sets of the structure disclosed in FIG. 1 being installed, according to one embodiment of the present invention;

FIG. 10 is a front view of the embodiment disclosed in FIG. 9;

AS shown in FIG. 9 and FIG. 10, the building warmed by pumped secondary fluid is structured through the fluid kinetic energy and thermal energy of a pressurized thermal energy source, which mainly consists of:

Heat exchanger (100): which is a heat exchanger made of a thermal conductive material, and constituted by a heat exchanger structure having flowpaths allowing the thermal energy fluid to pass through and capable of releasing the thermal energy to the secondary fluid passing through the exterior of the heat exchanger (100) at the same time, disposed vertically or obliquely at the location close to the fluid actuation device assembly (20) in the flowpath structure (500);

Thermal energy fluid inlet port of heat exchanger (1001): provided for inputting the fluid with thermal energy to the heat exchanger (100);

Thermal energy fluid outlet port of heat exchanger (1002): provided for outputting the fluid with thermal energy from the heat exchanger (100);

Fluid actuation device assembly (20): constituted by one or more than one of fluid actuation devices (200) and one or more than one of secondary fluid pump sets (202), and when the fluid actuation device (200) allows the pressurized thermal energy fluid to pass through, the fluid actuation device (200) is driven to output rotary kinetic energy through a rotation shaft (201), for directly driving the secondary fluid pump set (202) or through an input shaft of magnetic non-contact insulation type transmission device (220) of a magnetic non-contact insulation type transmission device (210) for driving the secondary fluid pump set (202);

Thermal energy fluid input port (101), thermal energy fluid outlet port (104): provided for inputting the thermal energy fluid capable of driving the fluid actuation device (200) of the fluid actuation device assembly (20), and enabling the heat exchanger (100) to perform cooling or heating;

Fluid inlet port of fluid actuation device (102), fluid outlet port of fluid actuation device (103): provided for inputting or outputting the thermal energy fluid passing the fluid actuation device (200), so as to output the rotary kinetic energy through the rotation shaft (201);

Thermal energy fluid pipeline (105): constituted by a thermal energy fluid pipeline structure selected according to the properties and temperature of the thermal energy fluid, for inputting the thermal energy fluid of a thermal energy fluid supply source from the thermal energy fluid inlet port (101) for being leaded to pass through the fluid actuation device (200) and the heat exchanger (100) then discharged from the thermal energy fluid outlet port (104), in which the heat exchanger (100) and the fluid actuation device (200) are connected by the thermal energy fluid pipeline (105), and thermal energy fluid flowpaths of the thermal energy fluid pipeline (105) for connecting the above two can be connected in series or in parallel, or in series and parallel;

Secondary fluid pump set (202): constituted by a blade set capable of rotating for pumping fluid, wherein the secondary fluid pump set (202) is directly driven by the rotation shaft (201) driven through the pressurized thermal energy fluid from the fluid actuation device (200), or the rotation shaft (201) inputs the rotary kinetic energy to the input shaft of magnetic non-contact insulation type transmission device (220) of the magnetic non-contact insulation type transmission device (210), and the output shaft of magnetic non-contact insulation type transmission device (221) of the magnetic non-contact insulation type transmission device (210) drives the secondary fluid pump set (202) for pumping the secondary fluid to be introduced from the secondary fluid inlet port of secondary fluid pump set (203) and be pumped out from the secondary fluid outlet port of secondary fluid pump set (204), a partition board (205) is installed between the secondary fluid inlet port of secondary fluid pump set (203) and the secondary fluid outlet port of secondary fluid pump set (204), the secondary fluid pumped from the secondary fluid outlet port of secondary fluid pump set (204) passes through the flowpath structure (500), the flow guide plate (600), the heat exchanger (100) and the secondary fluid outlet port (750) for allowing the thermal energy fluid to release thermal energy to the secondary fluid via the heat exchanger (100);

Semi-opened building (300): constituted by at least a lateral-side building structure and a top-side building structure for being installed with the heat exchanger (100), the fluid actuation device assembly (20) containing the fluid actuation device (200) and the secondary fluid pump set (202), the thermal energy fluid pipeline (105), the flowpath structure (500), the flow guide plate (600) and the secondary fluid inlet port (700), thereby to structure the building warmed by pumped secondary fluid, and to form the circulative pumping of partial secondary fluid;

Flowpath structure (500): configured by the internal structure of semi-opened building (300) or fluid pipelines which are additionally installed, for guiding the secondary fluid pumped by the secondary fluid pump set (202) to pass through the flow guide plate (600), the heat exchanger (100) and the secondary fluid outlet port (750) to enter the temperature differentiation body space allowing the secondary fluid to be pumped in and formed in the interior of semi-opened building (300), wherein a part of the thermal energy fluid returns from the secondary fluid inlet port (700) back to the secondary fluid inlet port (700) of the secondary fluid pump set (202);

Flow guide plate (600): constituted by one or more than one board-like or plate-like or having flow guide oblique surfaces flow direction guiding structures of secondary fluid, for being installed in the flowpath structure (500) disposed at both ends or at least one end of the secondary fluid inlet end (110) of the heat exchanger (100) or the secondary fluid outlet end (120) of the heat exchanger (100), for shunting the secondary fluid such that the secondary fluid can evenly pass through the heat exchanger (100) and enter to the temperature differentiation space of the semi-opened building (300);

Secondary fluid inlet port (700): constituted by a building structure installed between the temperature differentiation space of the semi-opened building (300) and the secondary fluid inlet port of secondary pump set (203), for receiving the external secondary fluid or receiving a part of the secondary fluid having thermal energy to return to the secondary fluid inlet port of secondary fluid pump set (203);

Characterized in that: the same building can be provided with two or more than two sets of thermally actuated and pumped secondary fluid systems, which includes two or more than two sets of heat exchangers with flowpath (100), fluid actuation device assemblies (20) containing fluid actuation devices (200) and secondary fluid pump sets (202), thermal energy fluid pipelines (105), flowpath structures (500), flow guide plates (600) and secondary fluid inlet ports (700), thereby to structure the building warmed by pumped secondary fluid, and to form the circulative pumping of partial secondary fluid;

FIG. 11 is a schematic view showing plural sets of the structure disclosed in FIG. 3 being installed, according to one embodiment of the present invention;

FIG. 12 is a front view of the embodiment disclosed in FIG. 11;

AS shown in FIG. 11 and FIG. 12, the building warmed by pumped secondary fluid is structured through the fluid kinetic energy and thermal energy of a pressurized thermal energy source, which mainly consists of:

Heat exchanger (100): which is a heat exchanger made of a thermal conductive material, and constituted by a heat exchanger structure having flowpaths allowing the thermal energy fluid to pass through and capable of releasing the thermal energy to the secondary fluid passing through the exterior of the heat exchanger (100) at the same time, disposed horizontally or almost horizontally at the location close to the secondary fluid outlet port (750) in the flowpath structure (500);

Thermal energy fluid inlet port of heat exchanger (1001): provided for inputting the fluid with thermal energy to the heat exchanger (100);

Thermal energy fluid outlet port of heat exchanger (1002): provided for outputting the fluid with thermal energy from the heat exchanger (100);

Fluid actuation device assembly (20): constituted by one or more than one of fluid actuation devices (200) and one or more than one of secondary fluid pump sets (202), and when the fluid actuation device (200) allows the pressurized thermal energy fluid to pass through, the fluid actuation device (200) is driven to output rotary kinetic energy through a rotation shaft (201), for directly driving the secondary fluid pump set (202) or through an input shaft of magnetic non-contact insulation type transmission device (220) of a magnetic non-contact insulation type transmission device (210) for driving the secondary fluid pump set (202);

Thermal energy fluid input port (101), thermal energy fluid outlet port (104): provided for inputting the thermal energy fluid capable of driving the fluid actuation device (200) of the fluid actuation device assembly (20), and enabling the heat exchanger (100) to perform cooling or heating;

Fluid inlet port of fluid actuation device (102), fluid outlet port of fluid actuation device (103): provided for inputting or outputting the thermal energy fluid passing the fluid actuation device (200), so as to output the rotary kinetic energy through the rotation shaft (201);

Thermal energy fluid pipeline (105): constituted by a thermal energy fluid pipeline structure selected according to the properties and temperature of the thermal energy fluid, for inputting the thermal energy fluid of a thermal energy fluid supply source from the thermal energy fluid inlet port (101) for being leaded to pass through the fluid actuation device (200) and the heat exchanger (100) then discharged from the thermal energy fluid outlet port (104), in which the heat exchanger (100) and the fluid actuation device (200) are connected by the thermal energy fluid pipeline (105), and thermal energy fluid flowpaths of the thermal energy fluid pipeline (105) for connecting the above two can be connected in series or in parallel, or in series and parallel;

Secondary fluid pump set (202): constituted by a blade set capable of rotating for pumping fluid, wherein the secondary fluid pump set (202) is directly driven by the rotation shaft (201) driven through the pressurized thermal energy fluid from the fluid actuation device (200), or the rotation shaft (201) inputs the rotary kinetic energy to the input shaft of magnetic non-contact insulation type transmission device (220) of the magnetic non-contact insulation type transmission device (210), and the output shaft of magnetic non-contact insulation type transmission device (221) of the magnetic non-contact insulation type transmission device (210) drives the secondary fluid pump set (202) for pumping the secondary fluid to be introduced from the secondary fluid inlet port of secondary fluid pump set (203) and be pumped out from the secondary fluid outlet port of secondary fluid pump set (204), a partition board (205) is installed between the secondary fluid inlet port of secondary fluid pump set (203) and the secondary fluid outlet port of secondary fluid pump set (204), the secondary fluid pumped from the secondary fluid outlet port of secondary fluid pump set (204) passes through the flowpath structure of secondary fluid (500), the flow guide plate (600), the heat exchanger (100) and the secondary fluid outlet port (750) for allowing the thermal energy fluid to release thermal energy to the secondary fluid via the heat exchanger (100);

Semi-opened building (300): constituted by at least a lateral-side building structure and a top-side building structure for being installed with the heat exchanger (100), the fluid actuation device assembly (20) containing the fluid actuation device (200) and the secondary fluid pump set (202), the thermal energy fluid pipeline (105), the flowpath structure (500), the flow guide plate (600) and the secondary fluid inlet port (700), thereby to structure the building warmed by pumped secondary fluid, and to form the circulative pumping of partial secondary fluid;

Flowpath structure (500): configured by the internal structure of semi-opened building (300) or fluid pipelines which are additionally installed, for guiding the secondary fluid pumped by the secondary fluid pump set (202) to pass through the flow guide plate (600), the heat exchanger (100) and the secondary fluid outlet port (750) to enter the temperature differentiation body space allowing the secondary fluid to be pumped in and formed in the interior of semi-opened building (300), wherein a part of the thermal energy fluid returns from the secondary fluid inlet port (700) back to the secondary fluid inlet port (700) of the secondary fluid pump set (202);

Flow guide plate (600): constituted by one or more than one board-like or plate-like or having flow guide oblique surfaces flow direction guiding structures of secondary fluid, for being installed in the flowpath structure (500) disposed at both ends or at least one end of the secondary fluid inlet end (110) of the heat exchanger (100) or the secondary fluid outlet end (120) of the heat exchanger (100), for shunting the secondary fluid such that the secondary fluid can evenly pass through the heat exchanger (100) and enter to the temperature differentiation space of the semi-opened building (300);

Secondary fluid inlet port (700): constituted by a building structure installed between the temperature differentiation space of the semi-opened building (300) and the secondary fluid inlet port of secondary pump set (203), for receiving the external secondary fluid or receiving a part of the secondary fluid having thermal energy to return to the secondary fluid inlet port of secondary fluid pump set (203);

Characterized in that: the same building can be provided with two or more than two sets of thermally actuated and pumped secondary fluid systems, which includes two or more than two sets of heat exchangers with flowpath (100), fluid actuation device assemblies (20) containing fluid actuation devices (200) and secondary fluid pump sets (202), thermal energy fluid pipelines (105), flowpath structures (500), flow guide plates (600) and secondary fluid inlet ports (700), thereby to structure the building warmed by pumped secondary fluid, and to form the circulative pumping of partial secondary fluid;

FIG. 13 is a schematic view showing plural sets of the structure disclosed in FIG. 5 being installed, according to one embodiment of the present invention;

FIG. 14 is a front view of the embodiment disclosed in FIG. 13;

AS shown in FIG. 13 and FIG. 14, the building warmed by pumped secondary fluid is structured through the fluid kinetic energy and thermal energy of a pressurized thermal energy source, which mainly consists of:

Heat exchanger (100): which is a heat exchanger made of a thermal conductive material, and constituted by a heat exchanger structure having flowpaths allowing the thermal energy fluid to pass through and capable of releasing the thermal energy to the secondary fluid passing through the exterior of the heat exchanger (100) at the same time, disposed vertically or obliquely at the location close to the fluid actuation device assembly (20) in the flowpath structure (500);

Thermal energy fluid inlet port of heat exchanger (1001): provided for inputting the fluid with thermal energy to the heat exchanger (100);

Thermal energy fluid outlet port of heat exchanger (1002): provided for outputting the fluid with thermal energy from the heat exchanger (100);

Fluid actuation device assembly (20): constituted by one or more than one of fluid actuation devices (200) and one or more than one of secondary fluid pump sets (202), and when the fluid actuation device (200) allows the pressurized thermal energy fluid to pass through, the fluid actuation device (200) is driven to output rotary kinetic energy through a rotation shaft (201), for directly driving the secondary fluid pump set (202) or through an input shaft of magnetic non-contact insulation type transmission device (220) of a magnetic non-contact insulation type transmission device (210) for driving the secondary fluid pump set (202);

Thermal energy fluid input port (101), thermal energy fluid outlet port (104): provided for inputting the thermal energy fluid capable of driving the fluid actuation device (200) of the fluid actuation device assembly (20), and enabling the heat exchanger (100) to perform cooling or heating;

Fluid inlet port of fluid actuation device (102), fluid outlet port of fluid actuation device (103): provided for inputting or outputting the thermal energy fluid passing the fluid actuation device (200), so as to output the rotary kinetic energy through the rotation shaft (201);

Thermal energy fluid pipeline (105): constituted by a thermal energy fluid pipeline structure selected according to the properties and temperature of the thermal energy fluid, for inputting the thermal energy fluid of a thermal energy fluid supply source from the thermal energy fluid inlet port (101) for being leaded to pass through the fluid actuation device (200) and the heat exchanger (100) then discharged from the thermal energy fluid outlet port (104), in which the heat exchanger (100) and the fluid actuation device (200) are connected by the thermal energy fluid pipeline (105), and thermal energy fluid flowpaths of the thermal energy fluid pipeline (105) for connecting the above two can be connected in series or in parallel, or in series and parallel;

Secondary fluid pump set (202): constituted by a blade set capable of rotating for pumping fluid, wherein the secondary fluid pump set (202) is directly driven by the rotation shaft (201) driven through the pressurized thermal energy fluid from the fluid actuation device (200), or the rotation shaft (201) inputs the rotary kinetic energy to the input shaft of magnetic non-contact insulation type transmission device (220) of the magnetic non-contact insulation type transmission device (210), and the output shaft of magnetic non-contact insulation type transmission device (221) of the magnetic non-contact insulation type transmission device (210) drives the secondary fluid pump set (202) for pumping the secondary fluid to be introduced from the secondary fluid inlet port of secondary fluid pump set (203) and be pumped out from the secondary fluid outlet port of secondary fluid pump set (204), a partition board (205) is installed between the secondary fluid inlet port of secondary fluid pump set (203) and the secondary fluid outlet port of secondary fluid pump set (204), the secondary fluid pumped from the secondary fluid outlet port of secondary fluid pump set (204) passes through the flowpath structure (500), the flow guide plate (600), the heat exchanger (100) and the secondary fluid outlet port (750) for allowing the thermal energy fluid to release thermal energy to the secondary fluid via the heat exchanger (100);

Closed type building (400): constituted by a closed structure, having a tubular, or spherical, or tank-shaped, or storage room, or cabinet-like sealed building formed with a space for accommodating the secondary fluid, wherein the interior being installed with the heat exchanger (100), the fluid actuation device assembly (20) containing the fluid actuation device (200) and the secondary fluid pump set (202), the thermal energy fluid pipeline (105), the flowpath structure (500), the flow guide plate (600) and the secondary fluid inlet port (700), thereby to structure the building warmed by pumped secondary fluid, and to form the circulative pumping of partial secondary fluid;

Flowpath structure (500): configured by the internal structure of closed type building (400) or fluid pipelines which are additionally installed, for guiding the secondary fluid pumped by the secondary fluid pump set (202) to pass through the flow guide plate (600), the heat exchanger (100) and the secondary fluid outlet port (750) to enter the temperature differentiation body space allowing the secondary fluid to be pumped in and formed in the interior of closed type building (400), wherein a part of the thermal energy fluid returns from the secondary fluid inlet port (700) back to the secondary fluid inlet port (700) of the secondary fluid pump set (202);

Flow guide plate (600): constituted by one or more than one board-like or plate-like or having flow guide oblique surfaces flow direction guiding structures of secondary fluid, for being installed in the flowpath structure (500) disposed at both ends or at least one end of the secondary fluid inlet end (110) of the heat exchanger (100) or the secondary fluid outlet end (120) of the heat exchanger (100), for shunting the secondary fluid such that the secondary fluid can evenly pass through the heat exchanger (100) and enter to the temperature differentiation space of the closed type building (400);

Secondary fluid inlet port (700): constituted by a building structure installed between the temperature differentiation space of the closed type building (400) and the secondary fluid inlet port of secondary pump set (203), for receiving a part of the secondary fluid having thermal energy to return to the secondary fluid inlet port of secondary fluid pump set (203);

Characterized in that: the same building can be provided with two or more than two sets of thermally actuated and pumped secondary fluid systems, which includes two or more than two sets of heat exchangers with flowpath (100), fluid actuation device assemblies (20) containing fluid actuation devices (200) and secondary fluid pump sets (202), thermal energy fluid pipelines (105), flowpath structures (500), flow guide plates (600) and secondary fluid inlet ports (700), thereby to structure the building warmed by pumped secondary fluid, and to form the circulative pumping of partial secondary fluid;

FIG. 15 is a schematic view showing plural sets of the structure disclosed in FIG. 7 being installed, according to one embodiment of the present invention;

FIG. 16 is a front view of the embodiment disclosed in FIG. 15;

AS shown in FIG. 15 and FIG. 16, the building warmed by pumped secondary fluid is structured through the fluid kinetic energy and thermal energy of a pressurized thermal energy source, which mainly consists of:

Heat exchanger (100): which is a heat exchanger made of a thermal conductive material, and constituted by a heat exchanger structure having flowpaths allowing the thermal energy fluid to pass through and capable of releasing the thermal energy to the secondary fluid passing through the exterior of the heat exchanger (100) at the same time, disposed horizontally or almost horizontally at the location close to the secondary fluid outlet port (750) in the flowpath structure (500);

Thermal energy fluid inlet port of heat exchanger (1001): provided for inputting the fluid with thermal energy to the heat exchanger (100);

Thermal energy fluid outlet port of heat exchanger (1002): provided for outputting the fluid with thermal energy from the heat exchanger (100);

Fluid actuation device assembly (20): constituted by one or more than one of fluid actuation devices (200) and one or more than one of secondary fluid pump sets (202), and when the fluid actuation device (200) allows the pressurized thermal energy fluid to pass through, the fluid actuation device (200) is driven to output rotary kinetic energy through a rotation shaft (201), for directly driving the secondary fluid pump set (202) or through an input shaft of magnetic non-contact insulation type transmission device (220) of a magnetic non-contact insulation type transmission device (210) for driving the secondary fluid pump set (202);

Thermal energy fluid input port (101), thermal energy fluid outlet port (104): provided for inputting the thermal energy fluid capable of driving the fluid actuation device (200) of the fluid actuation device assembly (20), and enabling the heat exchanger (100) to perform cooling or heating;

Fluid inlet port of fluid actuation device (102), fluid outlet port of fluid actuation device (103): provided for inputting or outputting the thermal energy fluid passing the fluid actuation device (200), so as to output the rotary kinetic energy through the rotation shaft (201);

Thermal energy fluid pipeline (105): constituted by a thermal energy fluid pipeline structure selected according to the properties and temperature of the thermal energy fluid, for inputting the thermal energy fluid of a thermal energy fluid supply source from the thermal energy fluid inlet port (101) for being leaded to pass through the fluid actuation device (200) and the heat exchanger (100) then discharged from the thermal energy fluid outlet port (104), in which the heat exchanger (100) and the fluid actuation device (200) are connected by the thermal energy fluid pipeline (105), and thermal energy fluid flowpaths of the thermal energy fluid pipeline (105) for connecting the above two can be connected in series or in parallel, or in series and parallel;

Secondary fluid pump set (202): constituted by a blade set capable of rotating for pumping fluid, wherein the secondary fluid pump set (202) is directly driven by the rotation shaft (201) driven through the pressurized thermal energy fluid from the fluid actuation device (200), or the rotation shaft (201) inputs the rotary kinetic energy to the input shaft of magnetic non-contact insulation type transmission device (220) of the magnetic non-contact insulation type transmission device (210), and the output shaft of magnetic non-contact insulation type transmission device (221) of the magnetic non-contact insulation type transmission device (210) drives the secondary fluid pump set (202) for pumping the secondary fluid to be introduced from the secondary fluid inlet port of secondary fluid pump set (203) and be pumped out from the secondary fluid outlet port of secondary fluid pump set (204), a partition board (205) is installed between the secondary fluid inlet port of secondary fluid pump set (203) and the secondary fluid outlet port of secondary fluid pump set (204), the secondary fluid pumped from the secondary fluid outlet port of secondary fluid pump set (204) passes through the flowpath structure of secondary fluid (500), the flow guide plate of secondary fluid (600), the heat exchanger (100) and the secondary fluid outlet port (750) for allowing the thermal energy fluid to release thermal energy to the secondary fluid via the heat exchanger (100);

Closed type building (400): constituted by a closed structure, having a tubular, or spherical, or tank-shaped, or storage room, or cabinet-like sealed building formed with a space for receiving the secondary fluid, wherein the interior being installed with the heat exchanger (100), the fluid actuation device assembly (20) containing the fluid actuation device (200) and the secondary fluid pump set (202), the thermal energy fluid pipeline (105), the flowpath structure (500), the flow guide plate (600) and the secondary fluid inlet port (700), thereby to structure the building warmed by pumped secondary fluid, and to form the circulative pumping of partial secondary fluid;

Flowpath structure (500): configured by the internal structure of closed type building (400) or fluid pipelines which are additionally installed, for guiding the secondary fluid pumped by the secondary fluid pump set (202) to pass through the flow guide plate (600), the heat exchanger (100) and the secondary fluid outlet port (750) to enter the temperature differentiation body space allowing the secondary fluid to be pumped in and formed in the interior of closed type building (400), wherein a part of the thermal energy fluid returns from the secondary fluid inlet port (700) back to the secondary fluid inlet port (700) of the secondary fluid pump set (202);

Flow guide plate (600): constituted by one or more than one board-like or plate-like or having flow guide oblique surfaces flow direction guiding structures of secondary fluid, for being installed in the flowpath structure (500) disposed at both ends or at least one end of the secondary fluid inlet end (110) of the heat exchanger (100) or the secondary fluid outlet end (120) of the heat exchanger (100), for shunting the secondary fluid such that the secondary fluid can evenly pass through the heat exchanger (100) and enter to the temperature differentiation space of the closed type building (400);

Secondary fluid inlet port (700): constituted by a building structure installed between the temperature differentiation space of the closed type building (400) and the secondary fluid inlet port of secondary pump set (203), for receiving a part of the secondary fluid having thermal energy to return to the secondary fluid inlet port of secondary fluid pump set (203);

Characterized in that: the same building can be provided with two or more than two sets of thermally actuated and pumped secondary fluid systems, which includes two or more than two sets of heat exchangers with flowpath (100), fluid actuation device assemblies (20) containing fluid actuation devices (200) and secondary fluid pump sets (202), thermal energy fluid pipelines (105), flowpath structures (500), flow guide plates (600) and secondary fluid inlet ports (700), thereby to structure the building warmed by pumped secondary fluid, and to form the circulative pumping of partial secondary fluid;

According to the building warmed by pumped secondary fluid provided by the present invention, wherein the temperature differentiation body installed in the temperature differentiation space includes gaseous or liquid fluid, or a solid member disposed in the mentioned gaseous or liquid fluid;

According to the building warmed by pumped secondary fluid provided by the present invention, wherein the mentioned thermal energy fluid includes gaseous or liquid thermal energy fluid;

According to the present invention, the building warmed by pumped secondary fluid includes to be applied in the liquid secondary fluid in a tubular or pool-shaped or tank-shaped building, or a lake, or river, or ocean, wherein the thermal energy is transmitted to the secondary fluid serving as the temperature differentiation body through inputting the gaseous or liquid thermal energy fluid;

FIG. 17 is a schematic view showing the present invention being applied in the secondary fluid in a tubular or pool-shaped or tank-shaped semi-opened building, or a lake, or river, or ocean, and the heat exchanger (100) being installed in the flowpath structure (500) and close to the fluid actuation device assembly (20).

Figure 18:
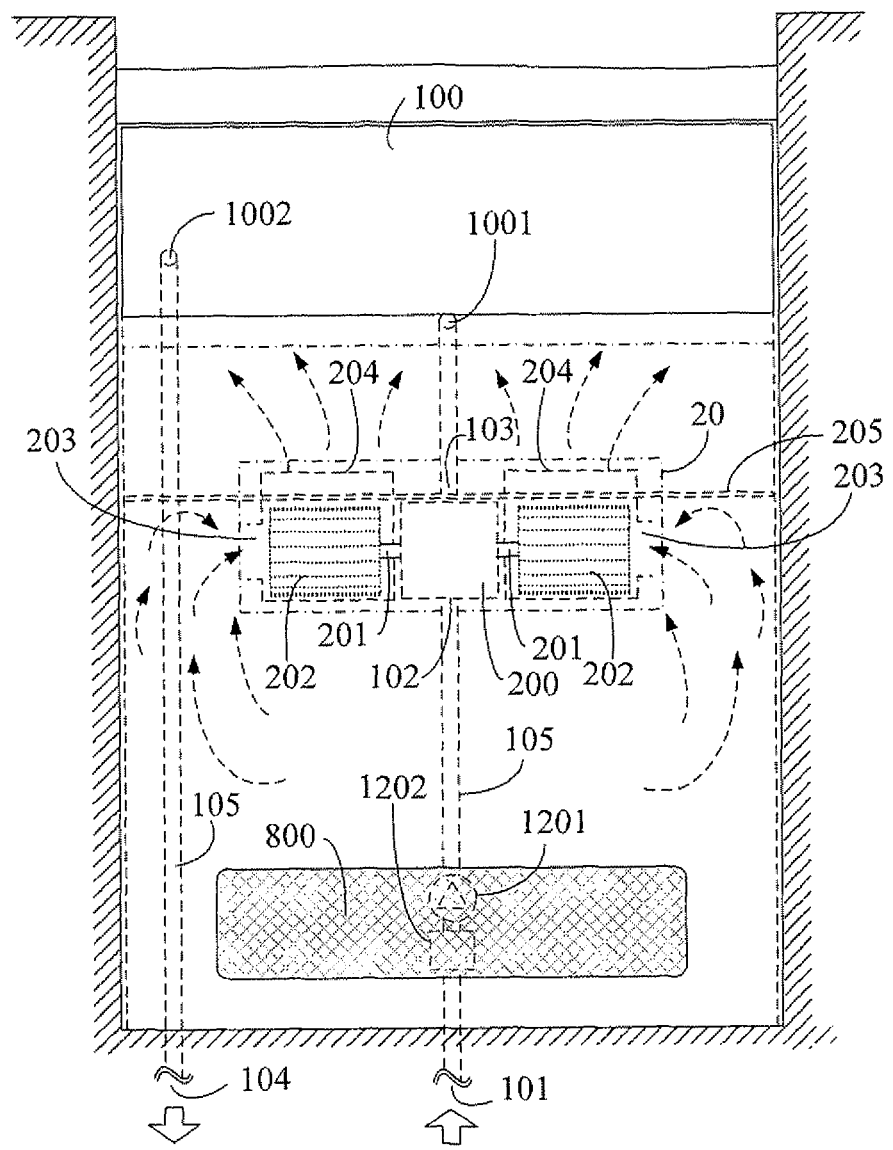
FIG. 18 is a front cross sectional view of FIG. 17 taken along an A-A line.

FIG. 18 is a front cross sectional view of FIG. 17 taken along an A-A line.

Figure 19:
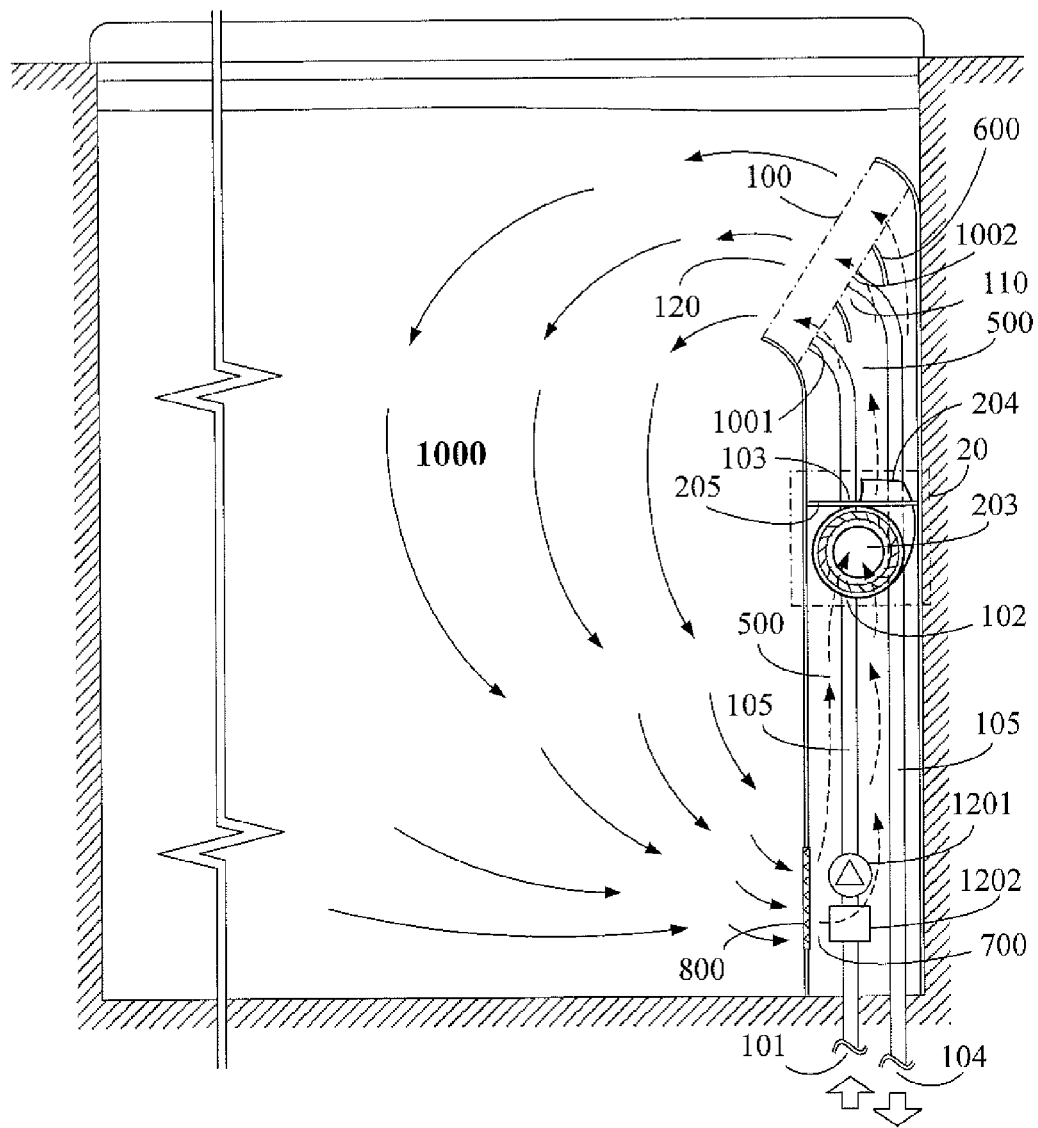
FIG. 19 is a schematic view showing the present invention being applied in the secondary fluid in a tubular, or spherical, or tank-shaped, or storage room, or cabinet-like sealed building, and the heat exchanger (100) being installed in the flowpath structure (500) and close to the fluid actuation device assembly (20).

AS shown in FIG. 17 and FIG. 18, the building warmed by pumped secondary fluid is structured through the fluid kinetic energy and thermal energy of a pressurized thermal energy source, which mainly consists of:

Heat exchanger (100): which is a heat exchanger made of a thermal conductive material, and constituted by a heat exchanger structure having flowpaths allowing the thermal energy fluid to pass through and capable of releasing the thermal energy to the secondary fluid passing through the exterior of the heat exchanger (100) at the same time, disposed vertically or obliquely at the location close to the fluid actuation device assembly (20) in the flowpath structure (500);

Thermal energy fluid inlet port of heat exchanger (1001): provided for inputting the fluid with thermal energy to the heat exchanger (100);

Thermal energy fluid outlet port of heat exchanger (1002): provided for outputting the fluid with thermal energy from the heat exchanger (100);

Fluid actuation device assembly (20): constituted by one or more than one of fluid actuation devices (200) and one or more than one of secondary fluid pump sets (202), and when the fluid actuation device (200) allows the pressurized thermal energy fluid to pass through, the fluid actuation device (200) is driven to output rotary kinetic energy through a rotation shaft (201), for directly driving the secondary fluid pump set (202) or through an input shaft of magnetic non-contact insulation type transmission device (220) of a magnetic non-contact insulation type transmission device (210) for driving the secondary fluid pump set (202);

Thermal energy fluid input port (101), thermal energy fluid outlet port (104): provided for inputting the thermal energy fluid capable of driving the fluid actuation device (200) of the fluid actuation device assembly (20), and enabling the heat exchanger (100) to perform cooling or heating;

Fluid inlet port of fluid actuation device (102), fluid outlet port of fluid actuation device (103): provided for inputting or outputting the thermal energy fluid passing the fluid actuation device (200), so as to output the rotary kinetic energy through the rotation shaft (201);

Thermal energy fluid pipeline (105): constituted by a thermal energy fluid pipeline structure selected according to the properties and temperature of the thermal energy fluid, for inputting the thermal energy fluid of a thermal energy fluid supply source from the thermal energy fluid inlet port (101) for being leaded to pass through the fluid actuation device (200) and the heat exchanger (100) then discharged from the thermal energy fluid outlet port (104), in which the heat exchanger (100) and the fluid actuation device (200) are connected by the thermal energy fluid pipeline (105), and thermal energy fluid flowpaths of the thermal energy fluid pipeline (105) for connecting the above two can be connected in series or in parallel, or in series and parallel;

Secondary fluid pump set (202): constituted by a blade set capable of rotating for pumping fluid, wherein the secondary fluid pump set (202) is directly driven by the rotation shaft (201) driven through the pressurized thermal energy fluid from the fluid actuation device (200), or the rotation shaft (201) inputs the rotary kinetic energy to the input shaft of magnetic non-contact insulation type transmission device (220) of the magnetic non-contact insulation type transmission device (210), and the output shaft of magnetic non-contact insulation type transmission device (221) of the magnetic non-contact insulation type transmission device (210) drives the secondary fluid pump set (202) for pumping the secondary fluid to be introduced from the secondary fluid inlet port of secondary fluid pump set (203) and be pumped out from the secondary fluid outlet port of secondary fluid pump set (204), a partition board (205) is installed between the secondary fluid inlet port of secondary fluid pump set (203) and the secondary fluid outlet port of secondary fluid pump set (204), the secondary fluid pumped from the secondary fluid outlet port of secondary fluid pump set (204) passes through the flowpath structure (500), the flow guide plate (600), the heat exchanger (100) and the secondary fluid outlet port (750) for allowing the thermal energy fluid to release thermal energy to the secondary fluid via the heat exchanger (100);

Semi-opened building (300): constituted by at least a lateral-side building structure and a top-side building structure for being installed with the heat exchanger (100), the fluid actuation device assembly (20) containing the fluid actuation device (200) and the secondary fluid pump set (202), the thermal energy fluid pipeline (105), the flowpath structure (500), the flow guide plate (600) and the secondary fluid inlet port (700), thereby to structure the building warmed by pumped secondary fluid, and to form the circulative pumping of partial secondary fluid;

Flowpath structure (500): configured by the internal structure of semi-opened building (300) or fluid pipelines which are additionally installed, for guiding the secondary fluid pumped by the secondary fluid pump set (202) to pass through the flow guide plate (600), the heat exchanger (100) and the secondary fluid outlet port (750) to enter the temperature differentiation body space allowing the secondary fluid to be pumped in and formed in the interior of semi-opened building (300), wherein a part of the thermal energy fluid returns from the secondary fluid inlet port (700) back to the secondary fluid inlet port (700) of the secondary fluid pump set (202);

Flow guide plate (600): constituted by one or more than one board-like or plate-like or having flow guide oblique surfaces flow direction guiding structures of secondary fluid, for being installed in the flowpath structure (500) disposed at both ends or at least one end of the secondary fluid inlet end (110) of the heat exchanger (100) or the secondary fluid outlet end (120) of the heat exchanger (100), for shunting the secondary fluid such that the secondary fluid can evenly pass through the heat exchanger (100) and enter to the temperature differentiation space of the semi-opened building (300);

Secondary fluid inlet port (700): constituted by a building structure installed between the temperature differentiation space of the semi-opened building (300) and the secondary fluid inlet port of secondary pump set (203), for receiving the external secondary fluid or receiving a part of the secondary fluid having thermal energy to return to the secondary fluid inlet port of secondary fluid pump set (203);

FIG. 19 is a schematic view showing the present invention being applied in the secondary fluid in a tubular, or spherical, or tank-shaped, or storage room, or cabinet-like sealed building, and the heat exchanger (100) being installed in the flowpath structure (500) and close to the fluid actuation device assembly (20).

Figure 20:
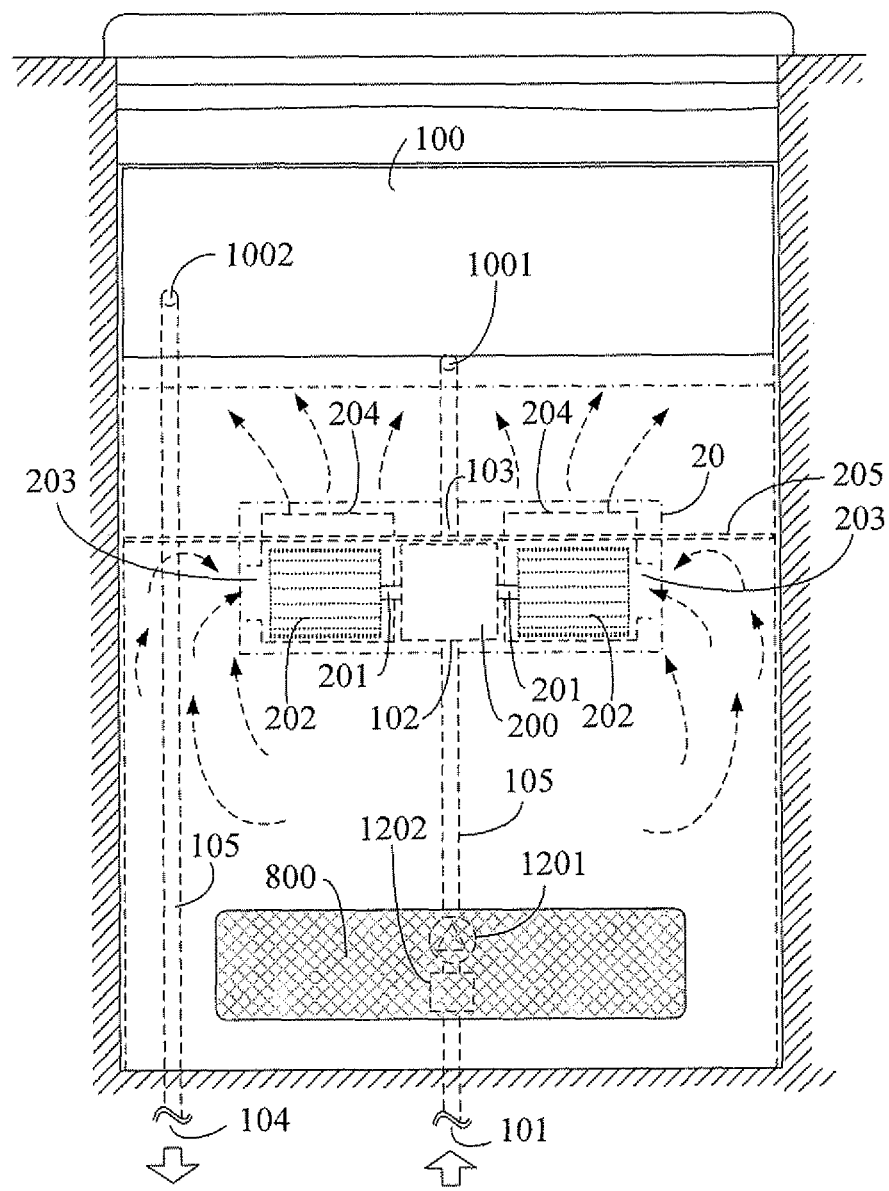
FIG. 20 is a front cross sectional view of FIG. 19 taken along a B-B line.

FIG. 20 is a front cross sectional view of FIG. 19 taken along a B-B line.

Figure 21:
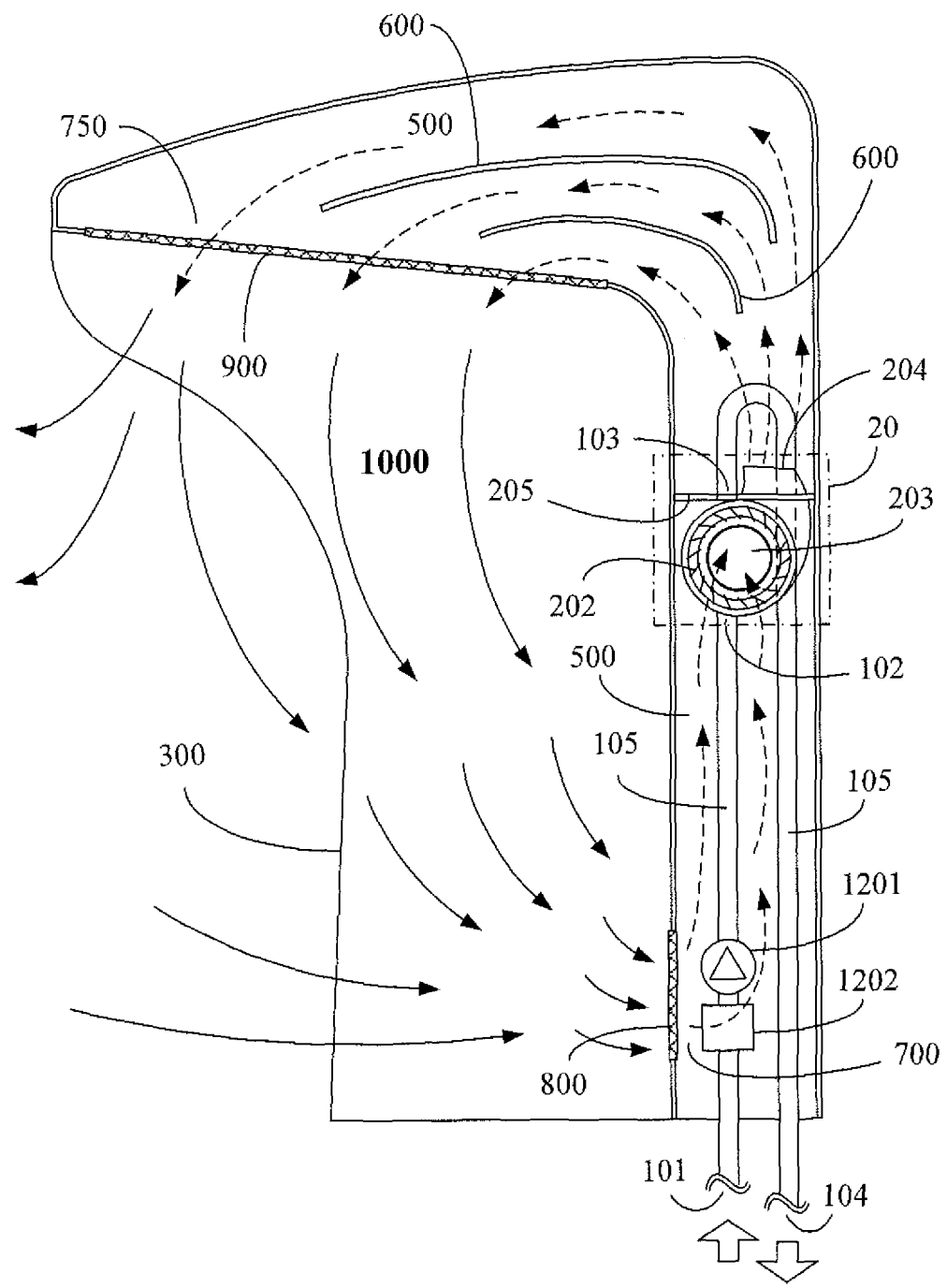
FIG. 21 is a lateral view showing the embodiment disclosed in FIG. 1 not being installed with the heat exchanger (100), and the fluid actuation device (200) being provided to drive the secondary fluid pump set (202) to pump the secondary fluid from the temperature differentiation body space to the internal space of the semi-opened building (300), according to the present invention.

AS shown in FIG. 19 and FIG. 20, the building warmed by pumped secondary fluid is structured through the fluid kinetic energy and thermal energy of a pressurized thermal energy source, which mainly consists of:

Heat exchanger (100): which is a heat exchanger made of a thermal conductive material, and constituted by a heat exchanger structure having flowpaths allowing the thermal energy fluid to pass through and capable of releasing the thermal energy to the secondary fluid passing through the exterior of the heat exchanger (100) at the same time, disposed vertically or obliquely at the location close to the fluid actuation device assembly (20) in the flowpath structure (500);

Thermal energy fluid inlet port of heat exchanger (1001): provided for inputting the fluid with thermal energy to the heat exchanger (100);

Thermal energy fluid outlet port of heat exchanger (1002): provided for outputting the fluid with thermal energy from the heat exchanger (100);

Fluid actuation device assembly (20): constituted by one or more than one of fluid actuation devices (200) and one or more than one of secondary fluid pump sets (202), and when the fluid actuation device (200) allows the pressurized thermal energy fluid to pass through, the fluid actuation device (200) is driven to output rotary kinetic energy through a rotation shaft (201), for directly driving the secondary fluid pump set (202) or through an input shaft of magnetic non-contact insulation type transmission device (220) of a magnetic non-contact insulation type transmission device (210) for driving the secondary fluid pump set (202);

Thermal energy fluid input port (101), thermal energy fluid outlet port (104): provided for inputting the thermal energy fluid capable of driving the fluid actuation device (200) of the fluid actuation device assembly (20), and enabling the heat exchanger (100) to perform cooling or heating;

Fluid inlet port of fluid actuation device (102), fluid outlet port of fluid actuation device (103): provided for inputting or outputting the thermal energy fluid passing the fluid actuation device (200), so as to output the rotary kinetic energy through the rotation shaft (201);

Thermal energy fluid pipeline (105): constituted by a thermal energy fluid pipeline structure selected according to the properties and temperature of the thermal energy fluid, for inputting the thermal energy fluid of a thermal energy fluid supply source from the thermal energy fluid inlet port (101) for being leaded to pass through the fluid actuation device (200) and the heat exchanger (100) then discharged from the thermal energy fluid outlet port (104), in which the heat exchanger (100) and the fluid actuation device (200) are connected by the thermal energy fluid pipeline (105), and thermal energy fluid flowpaths of the thermal energy fluid pipeline (105) for connecting the above two can be connected in series or in parallel, or in series and parallel;

Secondary fluid pump set (202): constituted by a blade set capable of rotating for pumping fluid, wherein the secondary fluid pump set (202) is directly driven by the rotation shaft (201) driven through the pressurized thermal energy fluid from the fluid actuation device (200), or the rotation shaft (201) inputs the rotary kinetic energy to the input shaft of magnetic non-contact insulation type transmission device (220) of the magnetic non-contact insulation type transmission device (210), and the output shaft of magnetic non-contact insulation type transmission device (221) of the magnetic non-contact insulation type transmission device (210) drives the secondary fluid pump set (202) for pumping the secondary fluid to be introduced from the secondary fluid inlet port of secondary fluid pump set (203) and be pumped out from the secondary fluid outlet port of secondary fluid pump set (204), a partition board (205) is installed between the secondary fluid inlet port of secondary fluid pump set (203) and the secondary fluid outlet port of secondary fluid pump set (204), the secondary fluid pumped from the secondary fluid outlet port of secondary fluid pump set (204) passes through the flowpath structure (500), the flow guide plate (600), the heat exchanger (100) and the secondary fluid outlet port (750) for allowing the thermal energy fluid to release thermal energy to the secondary fluid via the heat exchanger (100);

Closed type building (400): constituted by a closed structure, having a tubular, or spherical, or tank-shaped, or storage room, or cabinet-like sealed building formed with a space for accommodating the secondary fluid, wherein the interior being installed with the heat exchanger (100), the fluid actuation device assembly (20) containing the fluid actuation device (200) and the secondary fluid pump set (202), the thermal energy fluid pipeline (105), the flowpath structure (500), the flow guide plate (600) and the secondary fluid inlet port (700), thereby to structure the building warmed by pumped secondary fluid, and to form the circulative pumping of partial secondary fluid;

Flowpath structure (500): configured by the internal structure of closed type building (400) or fluid pipelines which are additionally installed, for guiding the secondary fluid pumped by the secondary fluid pump set (202) to pass through the flow guide plate (600), the heat exchanger (100) and the secondary fluid outlet port (750) to enter the temperature differentiation body space allowing the secondary fluid to be pumped in and formed in the interior of closed type building (400), wherein a part of the thermal energy fluid returns from the secondary fluid inlet port (700) back to the secondary fluid inlet port (700) of the secondary fluid pump set (202);

Flow guide plate (600): constituted by one or more than one board-like or plate-like or having flow guide oblique surfaces flow direction guiding structures of secondary fluid, for being installed in the flowpath structure (500) disposed at both ends or at least one end of the secondary fluid inlet end (110) of the heat exchanger (100) or the secondary fluid outlet end (120) of the heat exchanger (100), for shunting the secondary fluid such that the secondary fluid can evenly pass through the heat exchanger (100) and enter to the temperature differentiation space of the closed type building (400);

Secondary fluid inlet port (700): constituted by a building structure installed between the temperature differentiation space of the closed type building (400) and the secondary fluid inlet port of secondary pump set (203), for receiving a part of the secondary fluid having thermal energy to return to the secondary fluid inlet port of secondary fluid pump set (203);

According to the building warmed by pumped secondary fluid provided by the present invention, the heat exchanger (100) and the fluid actuation device (200) driven by thermal energy fluid can be installed by one of the following means according to actual needs, including:

1) Installing both of the heat exchanger (100) and the fluid actuation device (200) (as shown in the aforesaid embodiments); or 2) Installing the fluid actuation device (200) only;

FIG. 21 is a lateral view showing the embodiment disclosed in FIG. 1 not being installed with the heat exchanger (100), and the fluid actuation device (200) being provided to drive the secondary fluid pump set (202) to pump the secondary fluid from the temperature differentiation body space to the internal space of the semi-opened building (300), according to the present invention.

Figure 22:
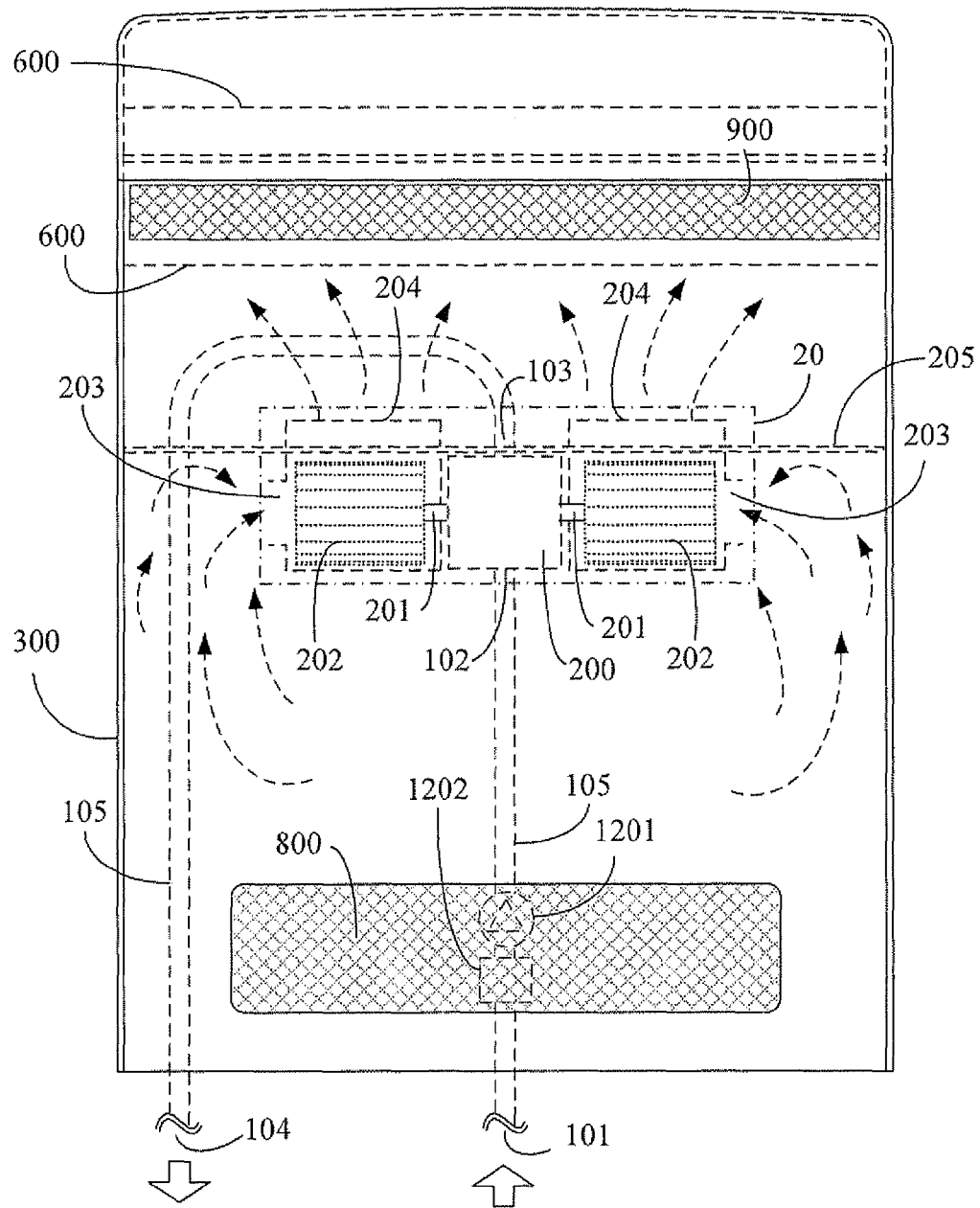
FIG. 22 is a front view of the embodiment disclosed in FIG. 21.

FIG. 22 is a front view of the embodiment disclosed in FIG. 21.

Figure 23:
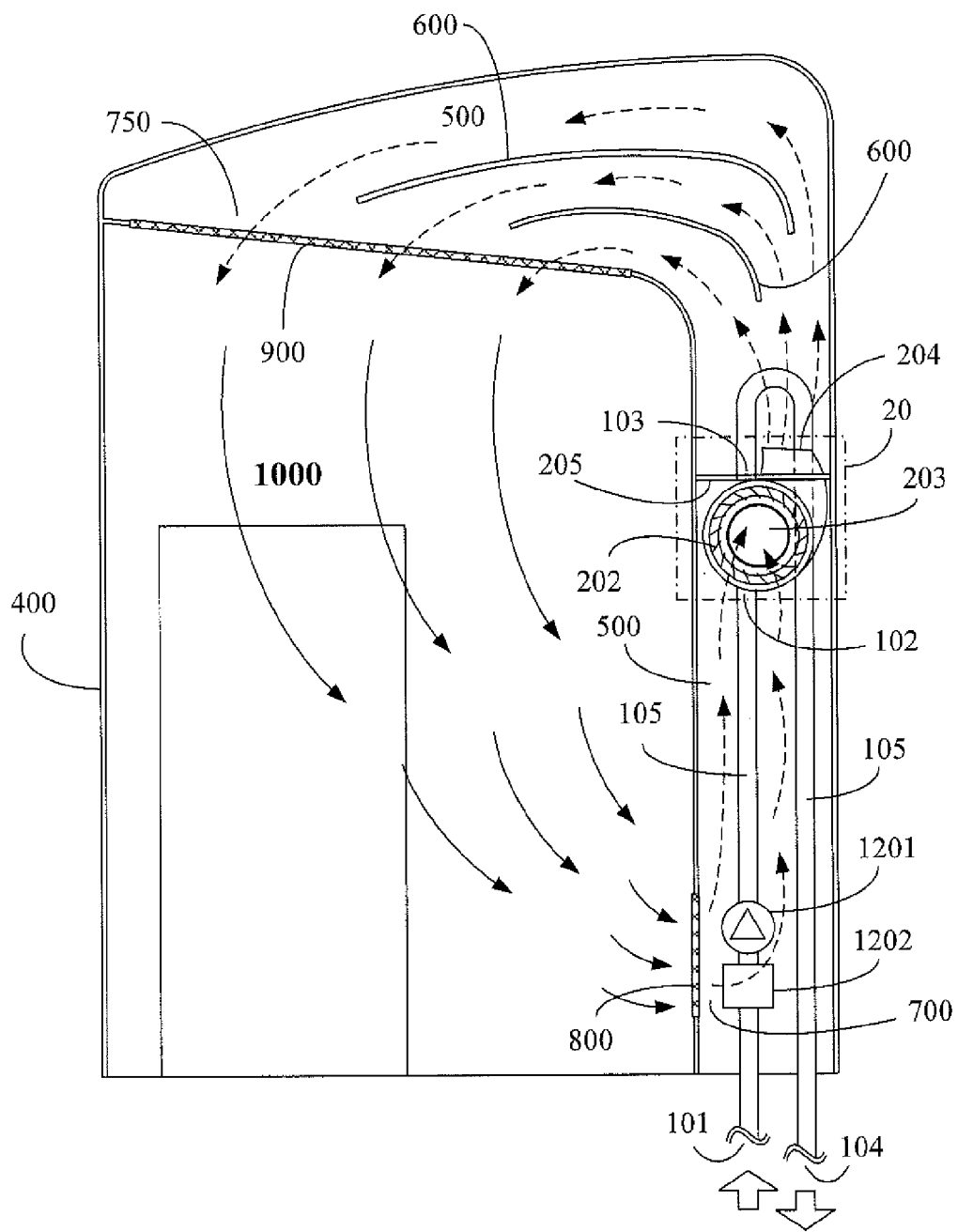
FIG. 23 is a lateral view showing the embodiment disclosed in FIG. 1 not being installed with the heat exchanger (100), and the fluid actuation device (200) being provided to drive the secondary fluid pump set (202) to pump the secondary fluid from the temperature differentiation body space to the internal space of the closed type building (400), according to the present invention.

As shown in FIG. 21 and FIG. 22, it mainly consists of:

Fluid actuation device assembly (20): constituted by one or more than one of fluid actuation devices (200) and one or more than one of secondary fluid pump sets (202), and when the fluid actuation device (200) allows the pressurized thermal energy fluid to pass through, the fluid actuation device (200) is driven to output the rotary kinetic energy through a rotation shaft (201), for directly driving the secondary fluid pump set (202) or through an input shaft of magnetic non-contact insulation type transmission device (220) of a magnetic non-contact insulation type transmission device (210) for driving the secondary fluid pump set (202);

Thermal energy fluid input port (101), thermal energy fluid outlet port (104): provided for inputting the thermal energy fluid capable of driving the fluid actuation device (200) of the fluid actuation device assembly (20);

Fluid inlet port of fluid actuation device (102), fluid outlet port of fluid actuation device (103): provided for inputting or outputting the thermal energy fluid passing the fluid actuation device (200), so as to output the rotary kinetic energy through the rotation shaft (201);

Thermal energy fluid pipeline (105): constituted by a thermal energy fluid pipeline structure selected according to the properties and temperature of the thermal energy fluid, for inputting the thermal energy fluid of a thermal energy fluid supply source from the thermal energy fluid inlet port (101) for being leaded to pass through the fluid actuation device (200), and then return back to the thermal energy fluid outlet port (104);

Secondary fluid pump set (202): constituted by a blade set capable of rotating for pumping fluid, wherein the secondary fluid pump set (202) is directly driven by the rotation shaft (201) driven through the pressurized thermal energy fluid from the fluid actuation device (200), or the rotation shaft (201) inputs the rotary kinetic energy to the input shaft of magnetic non-contact insulation type transmission device (220) of the magnetic non-contact insulation type transmission device (210), and the output shaft of magnetic non-contact insulation type transmission device (221) of the magnetic non-contact insulation type transmission device (210) drives the secondary fluid pump set (202) for pumping the secondary fluid to be introduced from the secondary fluid inlet port of secondary fluid pump set (203) and be pumped out from the secondary fluid outlet port of secondary fluid pump set (204), a partition board (205) is installed between the secondary fluid inlet port of secondary fluid pump set (203) and the secondary fluid outlet port of secondary fluid pump set (204), the secondary fluid pumped from the secondary fluid outlet port of secondary fluid pump set (204) passes through the flowpath structure (500), the flow guide plate (600), then pumped out from the secondary fluid outlet port (750);

Semi-opened building (300): constituted by at least a lateral-side building structure and a top-side building structure for being installed with the fluid actuation device assembly (20) containing the fluid actuation device (200) and the secondary fluid pump set (202), the thermal energy fluid pipeline (105), the flowpath structure (500), the flow guide plate (600) and the secondary fluid inlet port (700), so as to form the circulative pumping of partial secondary fluid;

Flowpath structure (500): configured by the internal structure of semi-opened building (300) or fluid pipelines which are additionally installed, for guiding the secondary fluid pumped by the secondary fluid pump set (202) to pass through the flow guide plate (600) and the secondary fluid outlet port (750) for entering the secondary fluid space inside the semi-opened building (300), wherein a part of the secondary fluid returns from the secondary fluid inlet port (700) back to the secondary fluid inlet port (700) of the secondary fluid pump set (202);

Flow guide plate (600): constituted by one or more than one board-like or plate-like or having flow guide oblique surfaces flow direction guiding structures of secondary fluid, for being installed in the flowpath structure (500) for shunting the secondary fluid such that the secondary fluid can evenly pass through the flowpath structure (500) and enter to the temperature differentiation space of the semi-opened building (300);

Secondary fluid inlet port (700): constituted by a building structure installed between the temperature differentiation space of the semi-opened building (300) and the secondary fluid inlet port of secondary pump set (203), for receiving the external secondary fluid or receiving a part of the secondary fluid having thermal energy to return to the secondary fluid inlet port of secondary fluid pump set (203);

FIG. 23 is a lateral view showing the embodiment disclosed in FIG. 1 not being installed with the heat exchanger (100), and the fluid actuation device (200) being provided to drive the secondary fluid pump set (202) to pump the secondary fluid from the temperature differentiation body space to the internal space of the closed type building (400), according to the present invention.

Figure 24:
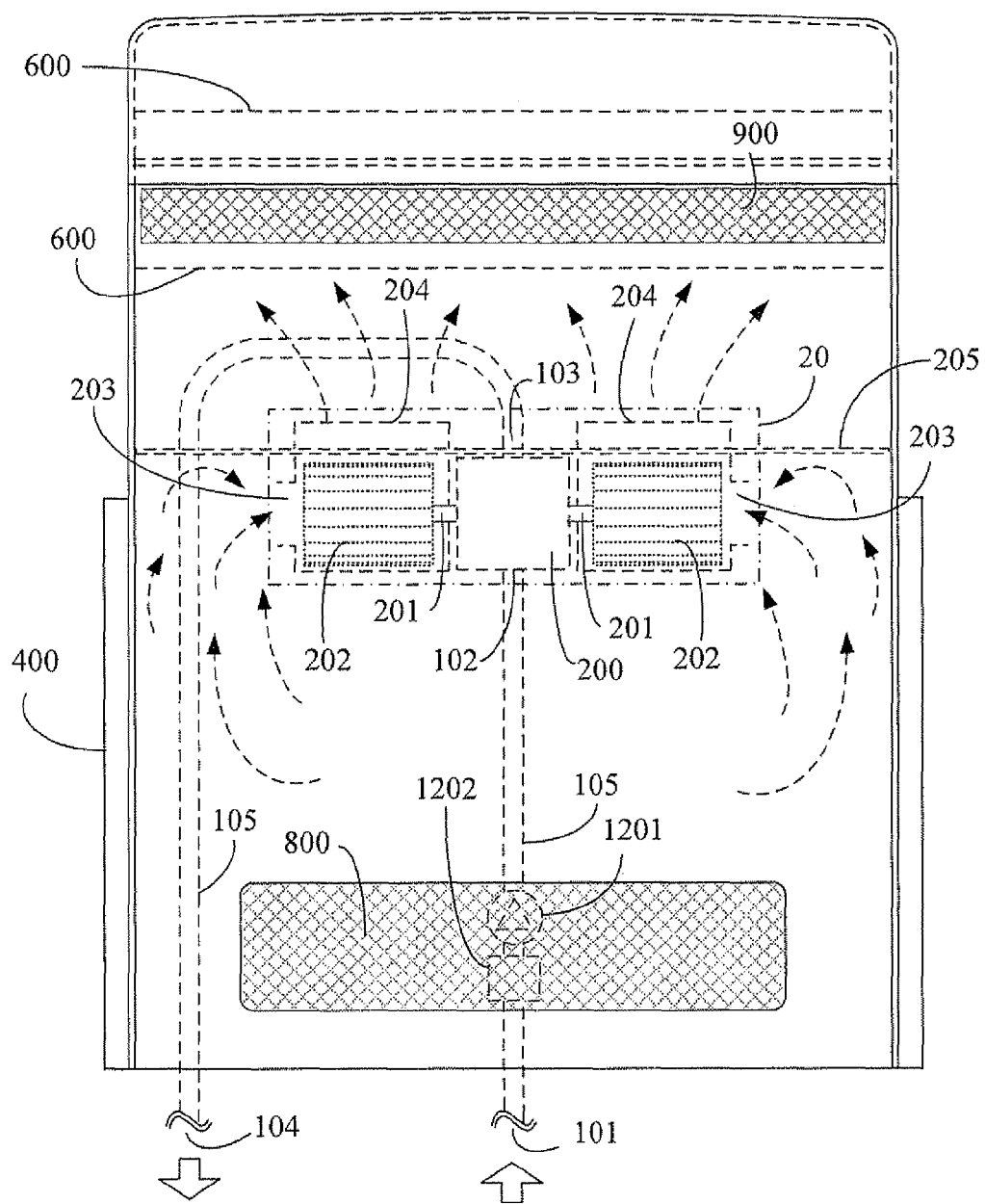
FIG. 24 is a front view of the embodiment disclosed in FIG. 23.

FIG. 24 is a front view of the embodiment disclosed in FIG. 23.

Figure 25:
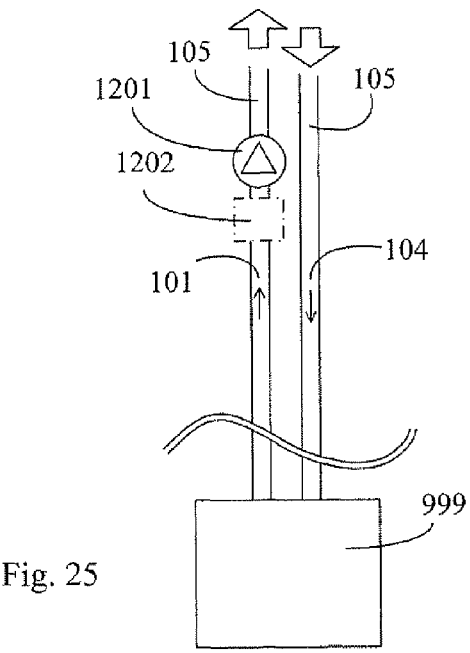
FIG. 25 is a schematic view showing the fluid source of pressurized thermal energy fluid (999) being provided and further in series connected with the thermal energy fluid pump (1201), according to one embodiment of the present invention.
Figure 26:
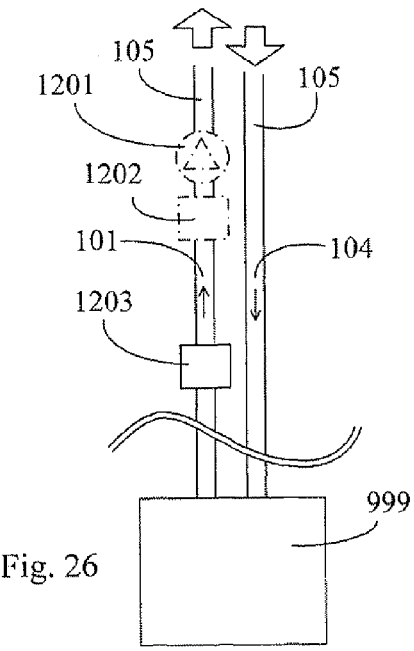
FIG. 26 is a schematic view showing the fluid source of pressurized thermal energy fluid (999) being further in series connected with the auxiliary temperature regulation device (1203), according to one embodiment of the present invention.
Figure 27:
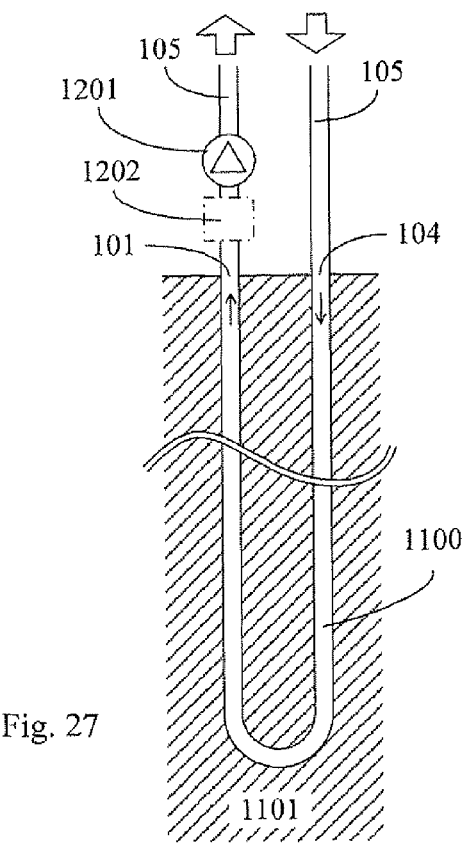
FIG. 27 is a schematic view showing the thermal energy fluid pump (1201) pumping the thermal energy fluid to pass through the fluid pipeline for transmitting natural thermal energy (1100) installed in the natural thermal energy body for being heated or cooled then pumped out, so as to configure the thermal energy fluid loop, according to the present invention.

As shown in FIG. 23 and FIG. 24, it mainly consists of:

Fluid actuation device assembly (20): constituted by one or more than one of fluid actuation devices (200) and one or more than one of secondary fluid pump sets (202), and when the fluid actuation device (200) allows the pressurized thermal energy fluid to pass through, the fluid actuation device (200) is driven to output the rotary kinetic energy through a rotation shaft (201), for directly driving the secondary fluid pump set (202) or through an input shaft of magnetic non-contact insulation type transmission device (220) of a magnetic non-contact insulation type transmission device (210) for driving the secondary fluid pump set (202);

Thermal energy fluid input port (101), thermal energy fluid outlet port (104): provided for inputting the thermal energy fluid capable of driving the fluid actuation device (200) of the fluid actuation device assembly (20);

Fluid inlet port of fluid actuation device (102), fluid outlet port of fluid actuation device (103): provided for inputting or outputting the thermal energy fluid passing the fluid actuation device (200), so as to output the rotary kinetic energy through the rotation shaft (201);

Thermal energy fluid pipeline (105): constituted by a thermal energy fluid pipeline structure selected according to the properties and temperature of the thermal energy fluid, for inputting the thermal energy fluid of a thermal energy fluid supply source from the thermal energy fluid inlet port (101) for being leaded to pass through the fluid actuation device (200), and then return back to the thermal energy fluid outlet port (104);

Secondary fluid pump set (202): constituted by a blade set capable of rotating for pumping fluid, wherein the secondary fluid pump set (202) is directly driven by the rotation shaft (201) driven through the pressurized thermal energy fluid from the fluid actuation device (200), or the rotation shaft (201) inputs the rotary kinetic energy to the input shaft of magnetic non-contact insulation type transmission device (220) of the magnetic non-contact insulation type transmission device (210), and the output shaft of magnetic non-contact insulation type transmission device (221) of the magnetic non-contact insulation type transmission device (210) drives the secondary fluid pump set (202) for pumping the secondary fluid to be introduced from the secondary fluid inlet port of secondary fluid pump set (203) and be pumped out from the secondary fluid outlet port of secondary fluid pump set (204), a partition board (205) is installed between the secondary fluid inlet port of secondary fluid pump set (203) and the secondary fluid outlet port of secondary fluid pump set (204), the secondary fluid pumped from the secondary fluid outlet port of secondary fluid pump set (204) passes through the flowpath structure (500), the flow guide plate (600), then pumped out from the secondary fluid outlet port (750);

Closed type building (400): constituted by a closed structure of a tubular, or spherical, or tank-shaped, or storage room, or cabinet-like sealed building with a space for accommodating the secondary fluid at the interior, wherein the interior being installed with the fluid actuation device assembly (20) containing the fluid actuation device (200) and the secondary fluid pump set (202), the thermal energy fluid pipeline (105), the flowpath structure (500), the flow guide plate (600) and the secondary fluid inlet port (700), so as to form the circulative pumping of partial secondary fluid;

Flowpath structure (500): configured by the internal structure of closed type building (400) or fluid pipelines which are additionally installed, for guiding the secondary fluid pumped by the secondary fluid pump set (202) to pass through the flow guide plate (600) and the secondary fluid outlet port (750) for entering the secondary fluid space inside the closed type building (400), wherein a part of the secondary fluid returns from the secondary fluid inlet port (700) back to the secondary fluid inlet port (700) of the secondary fluid pump set (202);

Flow guide plate (600): constituted by one or more than one board-like or plate-like or having flow guide oblique surfaces flow direction guiding structures of secondary fluid, for being installed in the flowpath structure (500) for shunting the secondary fluid such that the secondary fluid can evenly pass through the flowpath structure (500) and enter to the temperature differentiation space of the closed type building (400);

Secondary fluid inlet port (700): constituted by a building structure installed between the temperature differentiation space of the closed type building (400) and the secondary fluid inlet port of secondary pump set (203), for receiving a part of the secondary fluid having thermal energy to return to the secondary fluid inlet port of secondary fluid pump set (203);

According to the building warmed by pumped secondary fluid provided by the present invention, the source of the pressurized thermal energy fluid is configured by one or more than one of the following, including:
1) The pressurizing fluid source supplied by a water source having thermal energy and potential energy;
2) The pressurizing fluid source supplied by a water source of tap water having thermal energy and potential energy;
3) The 1) or 2) being further in series connected with a thermal energy fluid pump (1201) for pressurizing the fluid of fluid source of pressurized thermal energy fluid (999);

FIG. 25 is a schematic view showing the fluid source of pressurized thermal energy fluid (999) being provided and further in series connected with the thermal energy fluid pump (1201), according to one embodiment of the present invention;
4) The 1) or 2) or 3) being further in series connected with an auxiliary temperature regulation device (1203) for heating or cooling the fluid of the fluid source of pressurized thermal energy fluid (999) before pumping out;

FIG. 26 is a schematic view showing the fluid source of pressurized thermal energy fluid (999) being further in series connected with the auxiliary temperature regulation device (1203), according to one embodiment of the present invention.
5) A fluid pipeline for transmitting natural thermal energy (1100) embedded in the natural thermal energy body such as layer, lake, river or pond being processed with temperature equalization with the natural thermal energy body, and through the series-connected thermal energy fluid pump (1201) to perform pressurizing and pumping for generating the pressurized thermal energy fluid to pass through the fluid actuation device (200) and the heat exchanger (100), so as to configure a thermal energy fluid loop;

FIG. 27 is a schematic view showing the thermal energy fluid pump (1201) pumping the thermal energy fluid to pass through the fluid pipeline for transmitting natural thermal energy (1100) installed in the natural thermal energy body for being heated or cooled then pumped out, so as to configure the thermal energy fluid loop, according to the present invention;

According to the building warmed by pumped secondary fluid provided by the present invention, the driving means of the fluid actuation device (200) to the secondary fluid pump set (202) includes utilizing the rotation shat (201) inputting the rotary kinetic energy to the input shaft of magnetic non-contact insulation type transmission device (220) of the magnetic non-contact insulation type transmission device (210), then the output shaft of magnetic non-contact insulation type transmission device (221) of the magnetic non-contact insulation type transmission device (210) further driving the secondary fluid pump set (202), wherein the magnetic non-contact insulation type transmission device (210) is equipped with the input shaft of magnetic non-contact insulation type transmission device (220) for driving a passive rotation part of magnetic coupling member (211) of the magnetic non-contact insulation type transmission device (210), and then through a non-magnetic conductive insulation layer to drive an active rotation part of magnetic coupling member (212) of the magnetic non-contact insulation type transmission device (210), and though the passive side with permanent magnet to drive the passive rotation part of magnetic coupling member (211), thereby driving the secondary fluid pump set (202);

FIG. 28 is a schematic structural view showing a conventional magnetic non-contact insulation type transmission device (210); According to the building warmed by pumped secondary fluid provided by the present invention, the matching applications of the thermal energy fluid and secondary fluid include one or more than one of the following:

1) Inputting gaseous thermal energy fluid to drive the fluid actuation device (200) for generating the rotary kinetic energy, and transmitting cooling or heating thermal energy to gaseous secondary fluid;
2) Inputting liquid thermal energy fluid to drive the fluid actuation device (200) for generating the rotary kinetic energy, and transmitting cooling or heating thermal energy to gaseous secondary fluid;
3) Inputting gaseous thermal energy fluid to drive the fluid actuation device (200) for generating the rotary kinetic energy, and transmitting cooling or heating thermal energy to liquid secondary fluid;
4) Inputting liquid thermal energy fluid to drive the fluid actuation device (200) for generating the rotary kinetic energy, and transmitting cooling or heating thermal energy to liquid secondary fluid.

The invention claimed is:

1. A building heating/cooling system utilizing pumped secondary fluid, comprising:
    a heat exchanger (100) having a first thermal energy fluid inlet port (1001) and a first thermal energy fluid outlet port (1002);
    a fluid actuation device assembly (20) including at least one secondary fluid pump set (202) and a fluid actuation device (200,210), said fluid actuation device (200,210) being driven to rotate by a pressurized thermal energy fluid and said at least one secondary fluid pump set (202) being driven to rotate by said fluid actuation device (200,210), wherein an outlet of said fluid actuation device assembly (20) is connected to the first thermal energy fluid inlet port (1001) of the heat exchanger (100); and
    a secondary fluid flowpath structure (500) including at least one flow guide plate (600) for guiding said secondary fluid from an interior of a building through the fluid actuation device (200,210), through the heat exchanger (100), and back towards the interior of the building,
    wherein said pressurized thermal energy fluid is supplied to said fluid actuation device assembly (20) from an external source, passes through the fluid actuation device (200,210) to cause said fluid actuation device (200,210) to drive said at least one secondary fluid pump set (202), passes through said heat exchanger (100) to exchange thermal energy with said secondary fluid, and then is output to an exterior location, and
    wherein said secondary fluid is pumped by the at least one secondary fluid pump set (202) driven by said pressurized thermal energy fluid to flow past the heat exchanger (100) and exchange thermal energy with the secondary energy fluid in the heat exchanger (100).

2. The building heating/cooling system utilizing pumped secondary fluid as claimed in claim 1, wherein said heat exchanger (100) is disposed vertically or obliquely in said secondary fluid flowpath structure (500), and upstream of said fluid actuation device assembly (20).

3. The building heating/cooling system utilizing pumped secondary fluid as claimed in claim 1, further comprising a main fluid inlet port (101) through which said pressurized thermal exchange fluid is input from said external source for supply to said fluid actuation device assembly (20), a main fluid outlet port (104) through which said pressurized thermal exchange fluid is output to said exterior location, and thermal energy fluid piping (105), said thermal energy fluid piping (105) connecting said main fluid inlet port (101) to said fluid actuation device assembly (20), said fluid actuation device assembly (20) to a first thermal energy fluid inlet port (1001) of said heat exchanger (100), and a first thermal energy fluid outlet port (1002) of said heat exchanger (100) to said main fluid outlet port (104).

4. The building heating/cooling system utilizing pumped secondary fluid as claimed in claim 1, wherein the at least one secondary fluid pump set (202) includes a rotatable blade set for pumping the second fluid and driven by a rotation shaft (201) of the fluid actuation device (200,210), wherein the rotation shaft (201) drives the rotatable blade set through one of the following arrangements: (a) the rotation shaft (201) directly drives the rotatable blade set; and (b) the rotation shaft (201) drives the rotatable blade set through an insulated magnetic non-contact transmission device (210).

5. The building heating/cooling system utilizing pumped secondary fluid as claimed in claim 4, wherein the at least one secondary fluid pump set (202) further comprises a secondary fluid inlet port (203), a secondary fluid outlet port (204), and a partition board (205) installed between the secondary fluid inlet port (203) and the secondary fluid outlet port (204).

6. The building heating/cooling system utilizing pumped secondary fluid as claimed in claim 1, further comprising a secondary fluid inlet port (700) formed as a part of a structure of a building and a secondary fluid outlet port (750), wherein said secondary fluid from the heat exchanger (100) passes to a temperature differentiation space (1000) in the interior of the building through the secondary fluid outlet port (750), and wherein at least a portion of said secondary fluid that has passed through the secondary fluid outlet port (750) to the interior of the building returns from the temperature differentiation space (1000) through the secondary fluid inlet port (700).

7. The A building heating/cooling system utilizing pumped secondary fluid as claimed in claim 1, wherein at least one said flow guide plate (600) is positioned adjacent the heat exchanger (100) and includes a board or plate having flow guiding oblique surfaces for even distributing the secondary fluid as it passes through the heat exchanger (100).

8. The A building heating/cooling system utilizing pumped secondary fluid as claimed in claim 1, wherein a building in which the heating/cooling system is located is an at least partially open structure (300).

9. The building heating/cooling system utilizing pumped secondary fluid as claimed in claim 8, wherein said at least partially open structure (300) is closed at a top side and at least a first lateral side, and open at a second lateral side.

10. The building heating/cooling system utilizing pumped secondary fluid as claimed in claim 1, wherein a building in which the heating/cooling system is located is a closed and sealed structure (400) having one of a tubular, spherical, tank, storage room, and cabinet configuration through which said second fluid is circulated.

11. The building heating/cooling system utilizing pumped secondary fluid as claimed in claim 1, comprising a plurality of said secondary fluid pump sets (202).

12. The building heating/cooling system utilizing pumped secondary fluid as claimed in claim 1, wherein a building in which the heating/cooling system is located includes a plurality of said building heating/cooling systems, each including at least said fluid actuation device assembly (20), at least one said heat exchanger (100), and at least one said flowpath structure (500).

13. The building heating/cooling system utilizing pumped secondary fluid as claimed in claim 1, wherein said heat exchanger (100) is disposed at least substantially horizontally in said secondary fluid flowpath structure (500) at a location adjacent a secondary fluid outlet port (750) through which said secondary fluid passes into the interior of the building.

14. The building heating/cooling system utilizing pumped secondary fluid as claimed in claim 1, wherein said secondary fluid is a gas and said thermal energy fluid is one of a liquid and a gas.

15. The building heating/cooling system utilizing pumped secondary fluid as claimed in claim 1, wherein a building in which the heating/cooling system is located is one of a tubular building, a pool-shaped building, a tank, and a structure submersed in a lake, river, or ocean, wherein said secondary fluid is a liquid, and said pressurized thermal energy fluid is one of a liquid and a gas.

16. The building heating/cooling system utilizing pumped secondary fluid as claimed in claim 1, wherein said external source of the pressurized thermal exchange fluid is one of: (a) a water source having thermal energy and potential energy; (b) a tap water supply system having thermal energy and potential energy; and (c) a fluid pipeline carrying the thermal energy fluid to which natural thermal energy present in a temperature equalizing natural thermal energy body (1101) is transferred by temperature equalization, said temperature equalizing natural thermal energy body (1101) including one of a layer, lake, river, or pond, said fluid pipeline being series-connected with the thermal energy fluid pump (1201) to pump the pressurized thermal energy fluid to pass through the fluid actuation device (200) and the heat exchanger (100) and form a thermal energy fluid loop.

17. The building heating/cooling system utilizing pumped secondary fluid as claimed in claim 16, wherein the fluid pipeline further is connected in series with a flow regulation valve (1202).

18. The building heating/cooling system utilizing pumped secondary fluid as claimed in claim 17, wherein the water source in part (a) or the tap water supply system in part (b) is further connected in series with an auxiliary temperature regulation device (1203).

19. The building heating/cooling system utilizing pumped secondary fluid as claimed in claim 16, wherein the water source in part (a) or the tap water supply system in part (b) is connected in series with an auxiliary temperature regulation device (1203).

* * * * *